(«12») United States Patent
Arbuthnot et al.

(10) Patent No.: US 8,641,909 B2
(45) Date of Patent: Feb. 4, 2014

(54) METHOD AND APPARATUS FOR DISTURBING NETWORKED PULP

(75) Inventors: Ian Arbuthnot, Halls Head (AU);
Richard Triglavcanin, Dalkeith (AU);
Loc Thanh Le, Osborne Park (AU)

(73) Assignee: Outotec Oyj, Espoo (FI)

( * ) Notice: Subject to any disclaimer, the term of this patent is extended or adjusted under 35 U.S.C. 154(b) by 201 days.

(21) Appl. No.: 13/063,738

(22) PCT Filed: Sep. 4, 2009

(86) PCT No.: PCT/AU2009/001166
§ 371 (c)(1),
(2), (4) Date: Mar. 11, 2011

(87) PCT Pub. No.: WO2010/031107
PCT Pub. Date: Mar. 25, 2010

(65) Prior Publication Data
US 2011/0198303 A1   Aug. 18, 2011

(30) Foreign Application Priority Data

Sep. 17, 2008   (AU) ................................ 2008904841
Sep. 17, 2008   (AU) ................................ 2008904844
Jun. 4, 2009    (AU) ................................ 2009902571

(51) Int. Cl.
*B01D 21/06*   (2006.01)
*B01D 21/18*   (2006.01)
*B01D 21/28*   (2006.01)

(52) U.S. Cl.
CPC ............... *B01D 21/06* (2013.01); *B01D 21/18* (2013.01); *B01D 21/286* (2013.01)
USPC ......... 210/738; 210/800; 210/528; 210/532.1

(58) Field of Classification Search
USPC ................. 210/738, 800, 803, 523, 525, 528, 210/532.1
See application file for complete search history.

(56) References Cited

U.S. PATENT DOCUMENTS 1,938,894 A   12/1933   Darby
2,141,133 A   12/1938   Gibbs
(Continued)

FOREIGN PATENT DOCUMENTS

CA   2355575 A1   2/2003
FR   2247427      5/1975
(Continued)

OTHER PUBLICATIONS

Peter Ellis, International Search Report for PCT/AU2009/001166, Nov. 27, 2009.

(Continued)

*Primary Examiner* — Christopher Upton
(74) *Attorney, Agent, or Firm* — Chernoff Vilhauer McClung & Stenzel LLP

(57) ABSTRACT

The present invention provides a method (20) of separating pulp from a feed material within a tank (1), the method comprising the steps of (23) introducing the feed material (22) into the tank (1); (24) allowing the feed material (22) to settle in the tank (1); (25) allowing the pulp (21) to form into aggregates (13); (26) allowing the pulp aggregates (13) to settle towards the bottom of the tank (1) and form a networked layer (2) of pulp; and (27) causing a disturbance substantially uniformly across a disturbance zone (16) in an upper region of the networked layer (2), so as to disrupt the networked pulp in the disturbance zone within a predetermined period of time; thereby releasing entrained liquid from the networked pulp in the disturbance zone (16) and increasing the relative density of the pulp below the disturbance zone. The invention also provides a separation device (40) for separating pulp (21) from a feed material (22).

30 Claims, 21 Drawing Sheets

(56) References Cited

U.S. PATENT DOCUMENTS

| | | | |
|---|---|---|---|
| 3,923,652 A * | 12/1975 | Condolios et al. | 210/528 |
| 4,119,539 A * | 10/1978 | Ettel et al. | 210/800 |
| 4,120,791 A * | 10/1978 | Wright | 210/528 |
| 5,888,026 A | 3/1999 | Chen | |
| 6,758,978 B1 | 7/2004 | Bedell | |
| 7,235,182 B2 | 6/2007 | Taylor | |
| 2003/0106860 A1 | 6/2003 | Peloquin et al. | |
| 2005/0115907 A1* | 6/2005 | Taylor | 210/519 |
| 2011/0163041 A1* | 7/2011 | Arbuthnot et al. | 210/709 |
| 2011/0180484 A1* | 7/2011 | Arbuthnot et al. | 210/738 |

FOREIGN PATENT DOCUMENTS

| | | |
|---|---|---|
| GB | 2362837 A | 12/2001 |
| WO | 2004082802 A1 | 9/2004 |

OTHER PUBLICATIONS

Chilean Search Report for PCT/2011-000563, issued no earlier than Aug. 14, 2012, 12 pages.

Chinese Office action including the Search Report for Chinese Application No. 200980142132.5, dated Mar. 5, 2013, 16 pages.

* cited by examiner

METHOD AND APPARATUS FOR DISTURBING NETWORKED PULP

This is a national stage application filed under 35 USC 371 based on International Application No. PCT/AU2009/001166 filed Sep. 4, 2009, and claims priority under 35 USC 119 of Australian Patent Application No. AU 2008904844 filed Sep. 17, 2008, Australian Patent Application No. AU 2008904841 filed Sep. 17, 2008, and Australian Patent Application No. AU 2009902571 filed Jun. 4, 2009.

FIELD OF THE INVENTION

The present invention relates to separation devices for suspensions and pulps and in particular to a method for controlling the application of shear to pulp in a separation device. It has been developed primarily for use in thickeners and will be described hereinafter with reference to this application. However, it will be appreciated that the invention is not limited to this particular field of use.

BACKGROUND OF THE INVENTION

The following discussion of the prior art is intended to present the invention in an appropriate technical context and allow its significance to be properly appreciated. Unless clearly indicated to the contrary, however, reference to any prior art in this specification should not be construed as an admission that such art is widely known or forms part of common general knowledge in the field.

Separation devices, such as thickeners, clarifiers and concentrators, are typically used for separating solids from suspensions (typically containing solids suspended in a liquid) and are often found in the mining, mineral processing, food processing, sugar refining, water treatment, sewage treatment, and other such industries. These devices typically comprise a tank in which solids are deposited from a suspension or solution and settle toward the bottom as pulp or sludge to be drawn off from below and recovered. A dilute liquor of lower relative density is thereby displaced toward the top of the tank, for removal via an overflow launder. The suspension to be thickened is initially fed through a feed pipe, conduit or line into a feedwell disposed within the main tank. A rake assembly is conventionally mounted for rotation about a central drive shaft and typically has at least two rake arms having scraper blades to move the settled material inwardly for collection through an underflow outlet.

In its application to mineral processing, separation and extraction, a finely ground ore is suspended as pulp in a suitable liquid medium such as water at a consistency which permits flow, and settlement in quiescent conditions. The pulp is settled from the suspension by a combination of gravity with or without chemical and/or mechanical processes. Initially, coagulant and/or flocculant can be added into the suspension to improve the settling process. The suspension is then carefully mixed into the separation device, such as a thickener, to facilitate the clumping together of solid particles, eventually forming larger denser "aggregates" of pulp that are settled out of suspension. Liquid, also known as liquor, is typically trapped with the solid particles within the pulp aggregates.

Typically, several zones or layers of material having different overall densities gradually form within the tank, as illustrated in FIG. 1. At the bottom of the tank 1, the pulp forms a relatively dense zone 2 of compacted pulp or solids 3 that are frequently in the form of networked aggregates (i.e. the pulp aggregates are in continuous contact with one another). This zone 2 is typically called a "pulp bed" or a networked layer of pulp. Above the pulp bed 2, a hindered zone 4 tends to contain solids 5 that have not yet fully settled or "compacted". That is, the solids or aggregates 5 are not yet in continuous contact with one another (un-networked). Above the hindered zone 4 is a "free settling" zone 6, where solids or aggregates 7 are partially suspended in the liquid and descending toward the bottom of the tank 1. It will be appreciated that the hindered zone 4 is not always a distinct zone between the networked layer 2 and the free settling zone 6. Instead, the hindered zone 4 may form a transition or an interface between the networked layer 2 and the free settling zone 6 that blends between the two zones. Above the free settling zone 6 is a clarified zone 8 of dilute liquor, where little solids are present and the dilute liquor is removed from the tank 1 by way of an overflow launder (not shown). FIG. 1 also illustrates the feedwell 9 and underflow outlet 10 for removing the compacted pulp 3 from the tank 1.

It has hitherto been conventionally thought that to ensure that an appropriate underflow density is maintained within the pulp bed 2, it and the hindered zone 4 should be undisturbed to permit settling of the dense aggregates of solid particles into their desirable compacted arrangement. As a consequence, most developments in separation device technology concern the improvement of the settling process, either in the feedwell or the free settling zone 6, rather than any processes which may disturb the compacted arrangement of the solids particles in the pulp bed 3 or the partially compacted solids in the hindered zone 4.

It has also been found that as the pulp bed 2 increases in depth, it becomes increasingly difficult for released liquid to permeate through the pulp bed 2 and migrate upwardly into the clarified zone 8. One solution has been to provide dewatering pickets mounted to the rake arms to aid removal of such liquid, thereby increasing the underflow density and thus the efficiency of the separation process. These pickets are typically arranged at equally spaced intervals to produce dewatering channels in the pulp bed equally spaced across the diameter of the tank, and are designed to minimise disturbance of the pulp bed.

It has also been found that the rotation of the rake assembly, with or without pickets, increases the possibility of pulp bed rotation, which is also known as "donutting". Donutting occurs where discrete agglomerated masses of pulp particles, referred to as "donuts" or "islands", form around the rake assembly, causing an increase in the torque required to rotate the rake assembly and a decreased active cross-sectional area for separation. Hence, this results in a decrease in the density of the thickened pulp. In the case of a rake assembly, the agglomerated masses tend to accumulate around the rake arms and pickets, and thus tend to rotate with the rotation of the rake assembly. In donutting, the whole of the thickened pulp bed does not necessarily rotate when an agglomerated mass forms, nor does the rest of the contents of the thickening tank—only the agglomerated mass actually rotates. As a consequence, this phenomenon detrimentally affects thickener performance and efficiency in three primary ways. Firstly, the accumulation of agglomerated masses around the rake assembly impedes the formation of the desired bed of relatively uniform thickened pulp and decreases the active cross-sectional areas for separation, thus reducing the pulp density, or underflow density. Secondly, the increased torque that is required to rotate the rake assembly increases the wear on the drive assembly, thus increasing the frequency of maintenance and hence downtime for the thickener. Thirdly, donutting prevents the rake assembly from performing its primary function of raking the settled solids to the central discharge point.

Various solutions have been proposed for inhibiting or preventing donutting. One proposed solution has been the placement of stationary baffles or pickets to prevent the formation of agglomerated masses by breaking up any such formations around the rake assembly.

It is an object of the invention to overcome or ameliorate one or more of the deficiencies of the prior art, or at least to provide a useful alternative.

SUMMARY OF THE INVENTION

Accordingly, a first aspect of the invention provides a method of separating pulp from a feed material within a tank, the method comprising the steps of:
  introducing the feed material into the tank;
  allowing the feed material to settle in the tank,
  allowing the pulp to form into aggregates;
  allowing the pulp aggregates to settle towards the bottom of the tank and form a networked layer of pulp; and
  causing a disturbance substantially uniformly across a disturbance zone in an upper region of the networked layer, so as to disrupt the networked pulp in the disturbance zone within a predetermined period of time;
  thereby releasing entrained liquid from the networked pulp in the disturbance zone and increasing the relative density of the pulp below the disturbance zone.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The inventors have discovered unexpectedly and surprisingly that the application of a disturbance, preferably in the form of shear, to pulp can result in improved efficiency in the separation process, especially the settling process in a thickener. It is believed that by causing a disturbance substantially uniformly across the disturbance zone, the networked pulp in the disturbance zone is disrupted, by breaking up, disturbing, re-arranging, re-orienting, or "shaking" the continuous contact between the pulp, or subjecting it to a force. This disruption of the networked pulp in the disturbance zone enables the release of trapped liquid upwardly towards the clarified zone of dilute liquor and increases the density of the pulp below the disturbance zone relative to the pulp density above the disturbance zone.

Throughout the description and claims, the terms "disrupt", "disrupting", "disruption" and its variants are taken to mean breaking up, disturbing, re-arranging, re-orienting or "shaking" particles or a substance, as well as applying a force to the particles or substance. In the context of the present invention, these terms are taken to mean breaking up, disturbing, re-arranging, re-orienting, applying a force to, or "shaking" the organised structure of the networked pulp, including but not limited to the continuous contact between the networked pulp.

Preferably, the disturbance causing step comprises applying shear substantially uniformly across the disturbance zone. More preferably, the shear is applied substantially uniformly across the disturbance zone within the predetermined period of time.

Alternatively, the disturbance causing step comprises creating turbulence substantially uniformly across the disturbance zone.

Preferably, the predetermined period of time substantially corresponds to the time in which the networked pulp passes through the disturbance zone.

Preferably, the disturbance is such that the pulp below the disturbance zone reforms with a substantially higher density relative to the pulp above the disturbance zone. More preferably, the disturbance causing step induces a stepwise increase in the density of the pulp below the disturbance zone. In one preferred form, the density of the pulp below the disturbance zone is at least 5% greater than the density of pulp above the disturbance zone. In another preferred form, the density of the pulp below the disturbance zone is at least 10% greater than the density of pulp above the disturbance zone. In a further preferred form, the density of the pulp below the disturbance zone is at least 25% greater than the density of pulp above the disturbance zone. In yet another preferred form, the density of the pulp below the disturbance zone is at least 35% greater than the density of pulp above the disturbance zone. In a particularly preferred form, the density of the pulp below the disturbance zone is at least 50% greater than the density of pulp above the disturbance zone.

Preferably, the disturbance zone is within an upper 75% of the networked layer of pulp. More preferably, the disturbance zone is within an upper half of the networked layer of pulp. In one preferred form, the disturbance zone is within an upper 30% of the networked layer of pulp. In another preferred form, the disturbance zone is within an upper 10% of the networked layer of pulp. In a particularly preferred form, the disturbance zone is at or adjacent the top of the networked layer of pulp.

In one alternative form, the disturbance zone extends from the upper region of the networked layer of pulp to include a portion of the hindered zone. More preferably, the disturbance zone includes a lower portion of the hindered zone.

Preferably, the disturbance zone comprises a proportion of the upper region of the networked pulp layer. More preferably, the disturbance zone comprises a proportional volume of the upper region.

Preferably, the disturbance zone at least partially comprises a cross-sectional area of the upper region. More preferably, the disturbance zone comprises at least 10% of the cross-sectional area of the upper region within the predetermined period of time. Even more preferably, the disturbance zone comprises at least 30% of the cross-sectional area of the upper region within the predetermined period of time. It is preferred that the disturbance zone comprises at least 50% of the cross-sectional area of the upper region within the predetermined period of time. It is further preferred that the disturbance zone comprises at least 70% of the cross-sectional area of the upper region within the predetermined period of time. In one preferred form, the disturbance zone comprises at least 80% of the cross-sectional area of the upper region within the predetermined period of time. In another preferred form, the disturbance zone comprises at least 90% of the cross-sectional area of the upper region within the predetermined period of time. In a particularly preferred form, the disturbance zone comprises substantially the entire cross-sectional area of the upper region within the predetermined period of time.

Preferably, the shear is applied using a shearing mechanism selected from the group comprising liquid jets, gas jets, mechanical vibrations, ultrasonic impulses, fluidisation and mechanical agitation.

Preferably, the shearing mechanism is mechanical agitation and wherein the shear applying step is performed using a shearing device comprising at least two shearing arms supported for movement within the disturbance zone. More preferably, the shearing device comprises at least three shearing arms supported for rotation within the disturbance zone. In one preferred form, the shearing device comprises a plurality of shearing elements for applying shear. Preferably, each shearing element defines a zone of turbulence for disrupting the networked pulp.

Preferably, the shearing mechanism is mechanical agitation and wherein the shear applying step is performed using a shearing device comprising a plurality of shearing elements, the shearing elements being spaced apart along at least one arm of the shearing device to define respective intervals therebetween, such that a substantially uniform average shear is applied to the networked pulp in at least two of said intervals, along a line parallel to or coincident with the at least one arm. More preferably, the average shear in all the intervals between the shearing elements along the line is substantially uniform or the same.

Throughout the description and the claims, the term "average shear" means the average of shear applied to pulp between any two predetermined reference points. In this context, the two reference points typically (but not necessarily) coincide with adjacent shearing elements disposed on the at least one arm of the shearing device. It will be appreciated that in the method, the line may be non-linear in whole or part. For example, the line may include a portion that is arcuate, angled or offset with respect to a straight portion of the line. In one preferred form, the line is a radial line.

Preferably, the method comprises the further step of applying a substantially uniform cumulative shear to the networked pulp in the disturbance zone within the predetermined period of time.

Throughout the description and the claims, the term "cumulative shear" means the sum of the shear that is applied to a typical pulp aggregate or particle passing through a defined region. In this context, the cumulative shear is the total sum of shear that a typical pulp aggregate or particle experiences between its entry into and exit from the region, which is determined by the sum of "shear" events that have occurred and the magnitude of those shear events; that is, the number of times the typical pulp aggregate or particle has been "hit" (a shear force has been applied to it). These shear events not only include direct "hits" of the pulp aggregate or particle by the shearing device but also disturbances or "shaking" of the pulp aggregate or particle caught in the wake of the passage of the shearing device, which the inventors call a "zone of turbulence". These zones of turbulence are sufficient to apply a shear force to the pulp aggregate or particle, albeit less than the amount of shear directly applied by the shearing device.

Preferably, the method comprises the further step of applying a substantially uniform number of shear events to the networked pulp in the disturbance zone within the predetermined period of time.

Preferably, the shear applying step comprises applying a combination of at least two of substantially uniform average shear, substantially uniform cumulative shear and a substantially uniform number of shear events. More preferably, the shear applying step comprises applying substantially uniform average shear, substantially uniform cumulative shear and a substantially uniform number of shear events to the networked pulp.

Preferably, the shear applying step comprises moving the shearing device within the disturbance zone. More preferably, the shearing device rotates within the disturbance zone to apply shear. In one preferred form, the shear applying step comprises reversibly rotating the shearing device. In another preferred form, the shear applying step further comprises periodically reversing the rotation of the shearing device.

Preferably, the shear applying step comprises applying shear to at least a radial cross-section of the disturbance zone. More preferably, the shearing device moves at least partially through the radial cross-section of the disturbance zone. Preferably, the shear applying step comprises applying shear to at least a diametrical cross-section of the disturbance zone. More preferably, the shearing device moves at least partially through the diametrical cross-section of the disturbance zone.

Preferably, the method comprises rotating the shearing device about a central axis of the tank. Preferably, the central axis is substantially vertical with respect to the tank.

Alternatively, the shear applying step further comprises rotating the shearing device about an axis of rotation that is parallel, eccentric or offset with respect to a central axis of the tank. Preferably, the method comprises the step of moving the axis of rotation relative to the central axis. More preferably, the axis of rotation rotates, revolves or orbits at least partially around the central axis. In one preferred form, the axis of rotation at least partially traverses a regular path around the central axis. Alternatively, the axis of rotation at least partially traverses an irregular path around the central axis. In some embodiments, the axis of rotation moves in a circular path. In other embodiments, however, the axis of rotation moves in a non-circular path, which may be geometrically regular or irregular.

Preferably, the method comprises rotatably mounting the shearing device to a support and disposing the support for movement about the central axis. More preferably, the method comprises rotating the support about the central axis. In one embodiment, a central drive shaft extending axially through the tank moveably drives the support. In another embodiment, the support is moveably driven by a drive mechanism arranged at an outer edge of the tank, preferably a peripheral drive. In a further embodiment, the support is moveably driven by a drive shaft concentric to the central drive shaft.

Preferably, the method comprises disposing the support adjacent the top of the tank. Alternatively, the method comprises disposing the support adjacent the bottom of the tank. In one embodiment, the support comprises a service bridge extending radially from the central drive shaft above the tank.

In a further alternative, the shear applying step further comprises moving the shearing device substantially parallel to a central axis of the tank. Preferably, the method comprises the step of moving the shearing device substantially vertically with respect to the pulp bed. In one preferred form, the shearing device substantially reciprocates vertically.

In one preferred form, the method further comprises the step of providing the shearing device with at least two outwardly extending arms. Preferably, the method comprises extending the arms radially outward substantially to an outer perimeter of the region. Preferably, the method comprises applying substantially uniform average shear along the length of the arms. Preferably, the method comprises the step of moving the arms in a direction substantially parallel to the axis of rotation. Preferably, the method comprises the step of substantially reciprocating the arms.

Preferably, the method comprises the step of disposing one or more shearing elements along the axis of rotation to extend radially outwardly. Preferably, the method comprises the step of removably mounting the one or more shearing elements to a drive shaft of the shearing device.

Alternatively, the method comprises the step of disposing one or more shearing elements on the arms. Preferably, the method comprises arranging the shearing elements to apply shear along the arms.

Preferably, the method further comprises the step of extending the shearing elements at an angle of inclination with respect to a vertical plane. In one preferred form, the vertical plane is parallel to at least one shearing arm. In another preferred form, the vertical plane is at right angles to at least one shearing arm. In a further preferred form, the shearing elements are inclined with respect to vertical planes parallel and at right angles to at least one shearing arm. Preferably, the angle of inclination is between 30° and 50°, and most preferably around 45°. Preferably, the method further comprises the step of adjusting the angle of inclination of the shearing elements. Preferably, the method further comprises the step of supporting the shearing elements from the central axis of the tank.

Preferably, the method comprises providing the shearing device with at least one partially planar plate having a plurality of openings. More preferably, the method comprises moving the at least one partially planar plate substantially parallel to a central axis of the tank. In one preferred form, the method comprises slidably moving the at least one partially planar plate.

Preferably, the method comprises forming the at least one partially planar plate to have a shape complementary to a horizontal cross-section of the tank. In a particularly preferred form, the plate is a horizontal disc. Preferably, the method comprises evenly spacing the openings with respect to one another. Preferably, the openings are substantially uniform in size.

In another preferred form, the method comprises rotating the at least one partially planar plate about an axis of rotation. Preferably the at least one partially planar plate is arranged to be substantially vertical. Preferably, the method comprises progressively increasing the size of one or more openings from the axis of rotation to an outer edge of the at least one partially planar plate. Preferably, the method comprises substantially aligning one or more openings.

Preferably, the method comprises the step of providing a central drive shaft to drive rotation of the shearing device. Alternatively, the method comprises the step of driving movement of the shearing device independently of a central drive shaft. In one preferred form, the method comprises the step of arranging the independent drive mechanism at an outer edge of the tank, preferably a peripheral drive.

In another preferred form, the method comprises the step of arranging the independent drive mechanism to operate a drive shaft concentric to the central drive shaft for moving the shearing device. Preferably, the method comprises the concentric drive shaft moving the shearing device substantially parallel to the central drive shaft. More preferably, the concentric drive shaft substantially reciprocates the shearing device.

According to a second aspect, the invention provides a separation device for separating pulp from a feed material, the separation device comprising:

a tank for receiving the feed material, wherein feed material settles in the tank and the pulp forms into aggregates, the pulp aggregates settling towards the bottom of the tank and forming a networked layer of pulp; and a device for causing a disturbance substantially uniformly across a disturbance zone in an upper region of the networked layer, so as to disrupt the networked pulp in the disturbance zone within a predetermined period of time;

thereby releasing entrained liquid from the networked pulp in the disturbance zone and increasing the relative density of the pulp below the disturbance zone.

Preferably, the disturbance causing device comprises a shearing device for applying shear substantially uniformly across the disturbance zone. More preferably, the shearing device applies shear across the disturbance zone within the predetermined period of time.

Alternatively, the disturbance causing device creates turbulence substantially uniformly across the disturbance zone.

Preferably, the predetermined period of time substantially corresponds to the time in which the networked pulp passes through the disturbance zone.

Preferably, the disturbance is such that the pulp below the disturbance zone reforms with a substantially higher density relative to the pulp above the disturbance zone. More preferably, the disturbance induces a stepwise increase in the density of the pulp below the disturbance zone. In one preferred form, the density of the pulp below the disturbance zone is at least 5% greater than the density of pulp above the disturbance zone. In another preferred form, the density of the pulp below the disturbance zone is at least 10% greater than the density of pulp above the disturbance zone. In a further preferred form, the density of the pulp below the disturbance zone is at least 25% greater than the density of pulp above the disturbance zone. In yet another preferred form, the density of the pulp below the disturbance zone is at least 35% greater than the density of pulp above the disturbance zone. In a particularly preferred form, the density of the pulp below the disturbance zone is at least 50% greater than the density of pulp above the disturbance zone.

Preferably, the disturbance zone is within an upper 75% of the networked layer of pulp. More preferably, the disturbance zone is within an upper half of the networked layer of pulp. In one preferred form, the disturbance zone is within an upper 30% of the networked layer of pulp. In another preferred form, the disturbance zone is within an upper 10% of the networked layer of pulp. In a particularly preferred form, the disturbance zone is at or adjacent the top of the networked layer of pulp.

In one alternative form, the disturbance zone extends from the upper region of the networked layer of pulp to include a portion of the hindered zone. More preferably, the disturbance zone extends includes a lower portion of the hindered zone.

Preferably, the disturbance zone comprises a proportion of the upper region of the networked pulp layer. More preferably, the disturbance zone comprises a proportional volume of the upper region.

Preferably, the disturbance zone at least partially comprises a cross-sectional area of the upper region. More preferably, the disturbance zone comprises at least 10% of the cross-sectional area of the upper region within the predetermined period of time. Even more preferably, the disturbance zone comprises at least 30% of the cross-sectional area of the upper region within the predetermined period of time. It is preferred that the disturbance zone comprises at least 50% of the cross-sectional area of the upper region within the predetermined period of time. It is further preferred that the disturbance zone comprises at least 70% of the cross-sectional area of the upper region within the predetermined period of time. In one preferred form, the disturbance zone comprises at least 80% of the cross-sectional area of the upper region within the predetermined period of time. In another preferred form, the disturbance zone comprises at least 90% of the cross-sectional area of the upper region within the predetermined period of time. In a particularly preferred form, the disturbance zone comprises substantially the entire cross-sectional area of the upper region within the predetermined period of time.

Preferably, the shearing device applies shear using a shearing mechanism selected from the group comprising liquid jets, gas jets, mechanical vibrations, ultrasonic impulses, fluidisation and mechanical agitation.

Preferably, the shearing mechanism is mechanical agitation and wherein the shearing device comprises at least two shearing arms supported for movement within the disturbance zone. In one preferred form, the shearing device comprises at least three shearing arms supported for rotation within the disturbance zone. More preferably, the shearing device comprises a plurality of shearing elements for applying shear to the networked pulp. Preferably, each shearing element defines a zone of turbulence for disrupting the networked pulp.

Preferably, the shearing mechanism is mechanical agitation and wherein the shearing device comprises a plurality of shearing elements, the shearing elements being spaced apart along at least one arm of the shearing device to define respective intervals therebetween, such that a substantially uniform average shear is applied in at least two of said intervals, along a line parallel to or coincident with the at least one arm.

Preferably, a substantially uniform cumulative shear is applied to the networked pulp in the disturbance zone within the predetermined period of time.

Preferably, a substantially uniform number of shear events is applied to the networked pulp in the disturbance zone within the predetermined period of time.

Preferably, the shearing device applies a combination of at least two of substantially uniform average shear, substantially uniform cumulative shear and a substantially uniform number of shear events. More preferably, the shearing device applies a substantially uniform average shear, substantially uniform cumulative shear and a substantially uniform number of shear events to the networked pulp.

Preferably, the shearing device moves within the disturbance zone. More preferably, the shearing device rotates within the disturbance zone. In one preferred form, the shearing device is reversibly rotatable. In another preferred form, the rotation of the shearing device is periodically reversible.

Preferably, the shearing device applies shear to at least a radial cross-section of the disturbance zone. More preferably, the shearing device moves at least partially through the radial cross-section of the disturbance zone. Preferably, the shearing device applies shear to at least a diametrical cross-section of the disturbance zone. More preferably, the shearing device moves at least partially through the diametrical cross-section of the disturbance zone.

Preferably, the shearing device rotates about a central axis of the tank. More preferably, the central axis is substantially vertical with respect to the tank.

Alternatively, the axis of rotation of the shearing device is parallel, eccentric or offset with respect to a central axis of the tank. Preferably, the axis of rotation is movable relative to the central axis. Preferably, the axis of rotation rotates, revolves or orbits at least partially around the central axis. In one preferred form, the axis of rotation at least partially traverses a regular path around the central axis. In another preferred form, the axis of rotation at least partially traverses an irregular path around the central axis. In some embodiments, the axis of rotation moves in a circular path. In other embodiments, however, the axis of rotation moves in a non-circular path, which may be geometrically regular or irregular.

Preferably, the shearing device is rotatably mounted to a support, the support being disposed for movement about the central axis. More preferably, the support is rotatable about the central axis. In one embodiment, the support is movably driven by a central drive shaft extending axially through the tank. In another embodiment, the support is movably driven by a drive mechanism arranged at an outer edge of the tank, preferably a peripheral drive. In a further embodiment, the support is movably driven by a drive shaft concentric to the central drive shaft.

Preferably, the support is disposed adjacent the top of the tank. Alternatively, the support is disposed adjacent the bottom of the tank. In one embodiment, the support includes a service bridge extending radially from the central drive shaft above the tank.

In yet another alternative, the shearing device moves substantially parallel to a central axis of the tank to induce substantially uniform cumulative shear. Preferably, the shearing device moves substantially vertically with respect to the pulp bed. In one preferred form, the shearing device substantially reciprocates vertically.

In one preferred form, the shearing device comprises at least two outwardly extending arms. Preferably, one or more shearing elements are disposed on the arms. Preferably, the shearing elements apply shear along the arms. Preferably, the shearing device applies substantially uniform average shear along the length of the arms. Preferably, the arms extend radially outwardly substantially to an outer perimeter of the region.

Preferably, the arms are movable in a direction substantially parallel to the axis of rotation. More preferably, the arms substantially reciprocate.

In another preferred form, one or more shearing elements are disposed along the axis of rotation to extend radially outwardly. Preferably, the shearing device has a drive shaft and the one or more shearing elements are removably mountable on the drive shaft. More preferably, the shearing device comprises a collar for removably mounting the one or more shearing elements on the drive shaft.

Preferably, two or more shearing elements are arranged asymmetrically about the axis of rotation of the shearing device.

Preferably, two or more shearing elements are spaced at uneven intervals with respect to each other. Preferably, the uneven intervals progressively increase from the axis of rotation to an outer edge of at least one arm. As a result, the number of the shearing elements progressively decreases from the axis of rotation of the shearing device to an outer edge of at least one arm. In one preferred form, the uneven intervals are respectively proportional to the radial distances from the axis of rotation to the shearing elements.

Preferably, the shearing elements define a tapered profile of the shearing device. More preferably, the shearing elements progressively decrease in length from the axis of rotation of the shearing device to an outer edge of at least one arm.

Preferably, one or more shearing elements progressively decrease in thickness from the axis of rotation of the shearing device to an outer edge of at least one arm.

Preferably, one or more shearing elements extend at an angle of inclination with respect to a vertical plane. In one preferred form, the vertical plane is parallel to at least one shearing arm. In another preferred form, the vertical plane is at right angles to at least one shearing arm. In a further preferred form, the shearing elements are inclined with respect to vertical planes that are parallel and at right angles to at least one shearing arm. Preferably, the angle of inclination is between 30° and 50°, and most preferably around 45°. Preferably, the angle of inclination is adjustable. Preferably, one or more shearing elements are hingedly or pivotally mounted to the arms to adjust the angle of inclination. Preferably, one or more shearing elements are supported by one or more angled arms extending from a central drive shaft of the separation device.

Preferably, one or more shearing elements are substantially linear in shape. Alternatively, one or more shearing elements have a non-linear configuration. For example, the shearing element(s) may be helical, spiral or curved, in whole or part. In preferred embodiments, the shearing elements are formed from rods, pickets, blades, bars, wires, chains, sheets, plates, screen elements or mesh elements.

Preferably, the shearing device comprises at least one partially planar plate having a plurality of openings. More preferably, the at least one partially planar plate moves substantially parallel to a central axis of the tank. In one preferred form, the at least one partially planar plate is adapted for substantially slidable movement. More preferably, the at least one partially planar plate has a shape complementary to a horizontal cross-section of the tank. In a particularly preferred form, the plate is a horizontal disc. Preferably, the openings are evenly spaced with respect to one another. Preferably, the openings are substantially uniform in size.

In another preferred form, the at least one partially planar plate is adapted for rotation about an axis of rotation. Preferably the at least one partially planar plate is arranged to be substantially vertical. Preferably, one or more openings progressively increase in size from the axis of rotation to an outer edge of the at least one partially planar plate. Preferably, one or more openings are substantially aligned.

Preferably, the shearing device comprises a plurality of shearing elements arranged in a pattern. More preferably, the shearing device is rotatable about an axis of rotation. In one preferred form, two or more shearing elements are interconnected to form a mesh-like pattern. The mesh-like pattern may be partially or fully geometrical, and preferably comprises rectangular, square, diamond, triangular, hexagonal or other polygonal shapes. Preferably, the intervals between shearing elements progressively increase in proportion to the distance of their respective shearing elements to the axis of rotation. More preferably, the shearing device has the same mesh size.

In another preferred form, two or more shearing elements form one or more geometrical shapes. Preferably, the geometrical shapes are complementary in shape. Preferably, the geometrical shapes form a web-like pattern. Preferably, the geometrical shapes comprise rectangular, square, diamond, triangular, hexagonal or other polygonal shapes.

Preferably, the shearing device is disposed above the rake assembly. In one preferred form, the rake assembly is located adjacent the bottom of the tank.

Preferably, the average cumulative shear is at least substantially within 20% above or below a predetermined optimal shear value. Preferably, the average cumulative shear is at least substantially within 30% above or below the predetermined optimal shear value. Preferably, the average cumulative shear is at least substantially within 40% above or below the predetermined optimal shear value. Preferably, the average cumulative shear is at least substantially within 50% above or below the predetermined optimal shear value. Throughout the description and claims, the term "average cumulative shear" means the average of the entire cumulative shear that is applied to the pulp exiting the disturbance zone. For example, where cumulative shear is applied to a cylindrical disturbance zone, the average cumulative shear is the average of the cumulative shear taken over an area of a horizontal disc parallel to and adjacent the exit of the cylindrical disturbance zone.

Preferably, the predetermined optimal shear value is determined according to one or more parameters selected from the group consisting essentially of the speed of the shearing device, the shape of the shearing device, the depth of the shearing region, the pulp composition, the pulp particle size, the pulp flow velocity in the tank, the pulp yield stress, the pulp viscosity, the underflow specific gravity, the underflow weight per weight percentage, the rate at which flocculant is added to the suspension and the flux of the feed material from which the pulp settles.

Preferably, the separation device comprises a central drive shaft to drive rotation of the shearing device. Alternatively, the separation device comprises a drive mechanism for the shearing device that is independent of a central drive shaft. In one preferred form, the independent drive mechanism comprises a drive mechanism arranged at an outer edge of the tank. Preferably, the independent drive mechanism is a peripheral drive.

In another preferred form, the independent drive mechanism comprises a drive shaft concentric to a central drive shaft of the tank. Preferably, the concentric drive shaft rotates the shearing device. Alternatively, the concentric drive shaft moves the shearing device substantially parallel to the central drive shaft. More preferably, the concentric drive shaft substantially reciprocates the shearing device.

Preferably, the separation device is a thickener.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
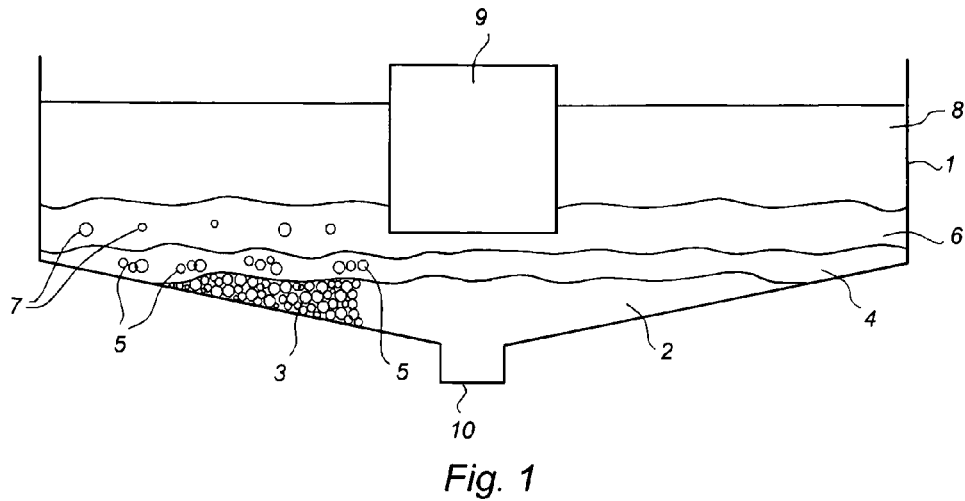
FIG. 1 is a schematic cross-sectional view of the typical zones of material within a separation device.

A preferred application of the invention is in the fields of mineral processing, separation and extraction, whereby finely ground ore is suspended as pulp in a suitable liquid medium such as water at a consistency which permits flow, and settlement in quiescent conditions. The pulp, which includes both solid particles and liquid, is settled from the suspension by a combination of gravity with or without chemical and/or mechanical processes. The pulp gradually clumps together to form aggregates of pulp as it descends from the feedwell towards the bottom of the tank. This process is typically enhanced by the addition of flocculating agents, also known as flocculants, which bind the settling solid or pulp particles together. These denser pulp aggregates settle more rapidly than the individual particles by virtue of their overall size and density relative to the surrounding liquid, gradually forming a networked layer or pulp bed 2, where the pulp is in a compacted arrangement and continuous contact with each other, as best shown in FIG. 1.

Figure 2A:
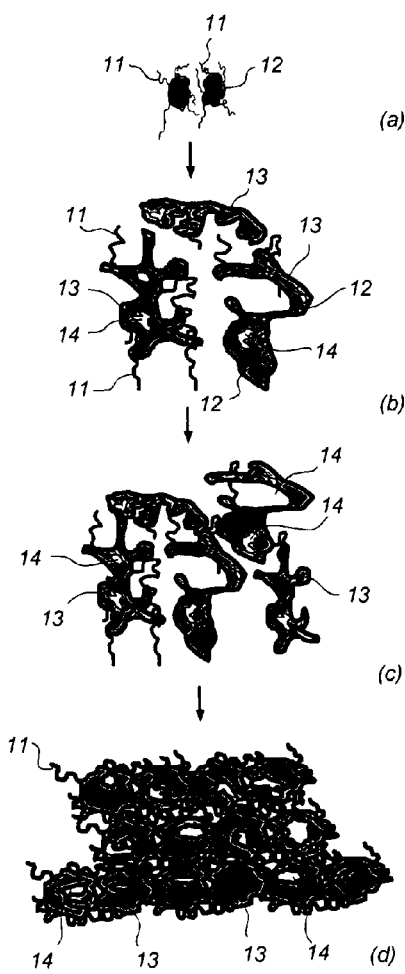
FIG. 2A is a schematic cross-sectional view illustrating the settling process in the separation device of FIG. 1.

The settling of pulp as it passes through the zones in a thickening tank 1 is described in more detail with reference to FIG. 2A, where corresponding features have been given the same reference numerals. Within the feedwell 9, flocculant 11 is added and adsorbs onto discrete pulp particles 12, as best shown in FIG. 2A(a). The flocculant 11 and pulp particles 12 grow and loosely bind together into porous pulp aggregates 13 within the feedwell 9 and/or as the pulp particles 12 flow out of the feedwell 9 into the free settling zone 6, as best shown in FIG. 2A(b). Due to their porous nature, liquid 14 is trapped within individual pulp aggregates. As the pulp aggregates 13 further descend in the tank 1 through the free settling zone 6 and into the hindered zone 4, they become crowded and impede settling of each other, as best shown in FIG. 2A(c). Gradually, the pulp aggregates 14 consolidate and compact together into an organised networked layer 2 of pulp, also called a pulp bed, as best shown in FIG. 2A(d). Nevertheless, despite this compacted arrangement of the networked pulp layer 2, it has been found that areas occur within the networked pulp layer where liquid remains trapped within and between the aggregates in the networked layer of pulp. As it is difficult for this trapped liquid to escape the pulp bed into the clarified zone of dilute liquor, the underflow density of the pulp is diminished.

The inventors have unexpectedly and surprisingly found that by causing a disturbance to the networked layer of pulp, trapped liquid is released and the relative density of the disturbed pulp is increased, thus improving the settling efficiency of the separation device. The inventors have also surprisingly discovered that this improved settling effect is best achieved by carefully controlling the disturbance to the pulp bed at an optimum level, as distinct from a minimum level. If the networked layer is disturbed too much, fractionation of the networked pulp into smaller pieces occurs, resulting in the smaller pieces settling more slowly. Too little disturbance fails to disrupt the networked pulp sufficiently to release enough liquid to improve settling efficiency.

Figure 2B:
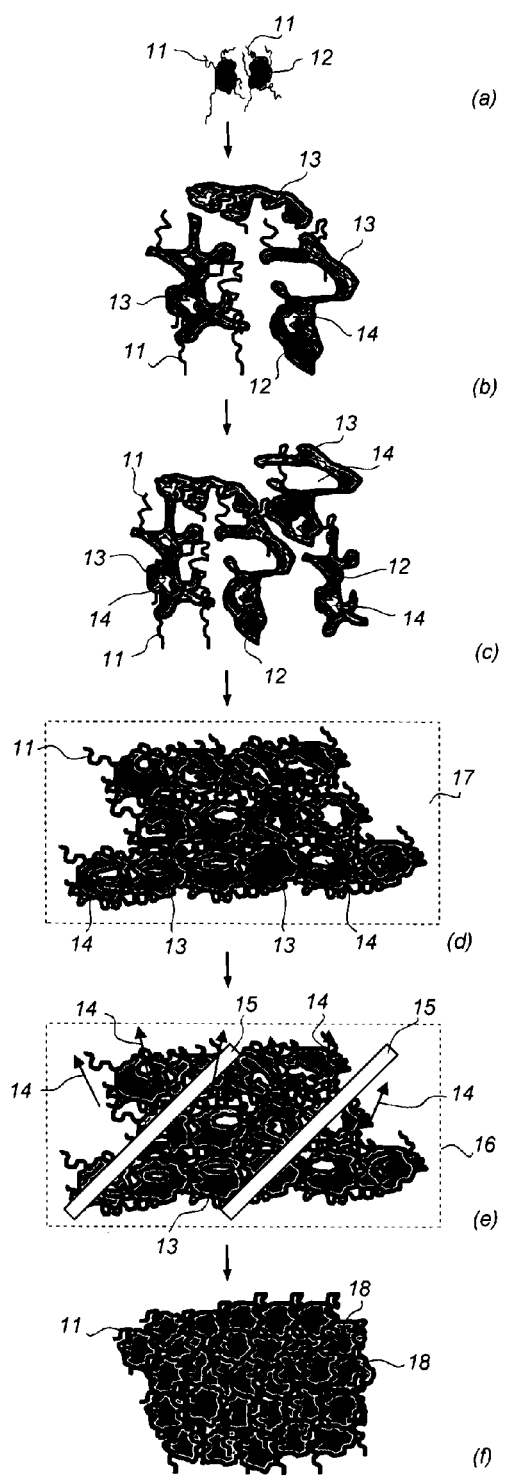
FIG. 2B is a schematic diagram illustrating the method of the invention.

Thus, the inventors have unexpectedly and surprisingly found that the optimal disturbance for achieving this improved separation efficiency continuously over the work cycles of the separation device is obtained by causing the disturbance substantially uniformly across a disturbance zone in an upper region of the networked layer, as best shown in FIG. 2B where corresponding features have been given the same reference numerals. As shown in FIGS. 2B(a) to 2B(d), flocculant is added into the feedwell 9 to adsorb onto discrete pulp particles 12 to promote the formation of aggregates 13 that descend and form a networked layer of pulp. Unlike the conventional settling process illustrated in FIG. 2A, where the pulp aggregates 13 are left alone during formation of the networked layer 2, a disturbance 15 is caused substantially uniformly across within a disturbance zone 16 in an upper region 17 of the networked layer 2, as best shown in FIG. 2B(e). As a consequence, a proportion of the networked pulp 3 (being the networked pulp that passes through the disturbance zone 16) is disrupted to release liquid 14 trapped within the networked pulp, thus increasing the relative density of the pulp 18 below the disturbance zone 16, as best shown in FIG. 2B(f).

The disturbance is preferably at least present in the disturbance zone 16 for a period of time in which the networked pulp passes through the disturbance zone, from entry to exit. It is preferred that in practice the disturbance is caused continuously in the disturbance zone 16 during operation of the separation device over its work cycles to provide its advantageous and beneficial effects continuously for the entire period of the separation process. However, the disturbance may be limited to discrete time periods where desired.

The inventors have found that a preferred and convenient way of causing the disturbance is to apply shear substantially uniformly across the disturbance zone, although other forms of disturbance may be used, for example creating turbulence across the disturbance zone. The disturbance, preferably the application of shear, substantially uniformly across the disturbance zone 16 results in an increased probability of the networked pulp receiving a disturbance that disrupts its generally organised structure. The disturbance may also disrupt the continuous contact between the networked pulp. The disruption can take the form of shaking or disturbing the networked pulp. Alternatively, or cumulatively, the disruption can take the form of re-arranging, re-orienting or breaking up the networked pulp. In both cases, the disruption has the effect of releasing liquid 14 trapped in the networked pulp, either between pulp aggregates or within a pulp aggregate. Thus, a substantial proportion of this trapped liquid 14 is released upwardly out of the networked pulp bed 2. It is believed that the application of shear to the networked pulp "shakes", re-arranges or breaks up its structure and/or continuous contact between the networked pulp so that the pulp below the disturbance zone becomes more dense, which results in an enhancement of their settling rate and/or their packing density. Moreover, the disturbance is not so excessive as to cause fractionation of the networked pulp into smaller pieces, which settle more slowly. The relatively denser pulp tends to reform into a networked pulp layer below the disturbance zone, due to its own weight applying compaction forces to the pulp. As a result, the invention provides the appropriate amount of disturbance to increase the settling rate and/or underflow density of the pulp in the networked layer or pulp bed 2, thus leading to increased efficiency and performance of the separation device.

It will be appreciated by those skilled in the art that the concept of causing a disturbance, for example by applying shear, in a disturbance zone in the networked layer 2, is contrary to conventional thought and has not been contemplated as such in the prior art. In the prior art, it was preferred not to disturb the pulp bed 2 or the hindered zone 4, since most of the aggregates are compacted or almost compacted (in the case of the hindered zone 4), and improvements were focussed on improving the efficiency of the settling process, either in the feedwell 9 or in the free settling zone 6 in the tank 1. This was reflected in the design of thickeners specifically to minimise motion within the pulp bed 2. For example, equally spaced predominantly vertically extending pickets were mounted on the rake arms to create vertical dewatering channels to release liquid. However, the configuration and spacing of the pickets were designed to ensure that the pickets moved gently through the pulp bed 2 to minimise any turbulence created by the pickets or their associated dewatering channels. A further advantage of the invention is that disturbing the networked pulp layer 2 in the disturbance zone 16, for example by the application of shear, tends to inhibit the formation of donuts in the networked layer.

The inventors have discovered that the disturbance, preferably by way of shear, induces a stepwise increase in the density of the pulp below the disturbance zone. In the context of the application of the invention to a thickening process, the inventors have found that by controlling the disturbance, preferably shear, to an optimal amount using at least one or more of three primary options that will be discussed in more detail below, this stepwise increase in density of the pulp below the disturbance zone is at least a 5% increase compared to the density of pulp above the disturbance zone. In one preferred form, there is at least a 10% increase compared to the density of pulp above the disturbance zone. In other preferred forms, the density of the pulp below the disturbance zone is at least 25%, preferably at least 35% and more preferably at least 50%, greater than the density of pulp above the disturbance zone.

It will be appreciated that during operation of the separation device, the depth of the networked pulp layer 2 will gradually increase. Alternatively, the separation device may have a relatively low networked pulp layer 2 for operational requirements. Consequently, the disturbance zone 16 may initially occupy a larger proportion of the networked pulp layer 2, and in such cases the disturbance zone may be within an upper 75% of the networked layer of pulp. Where a typical depth of the networked pulp layer is present in the tank, the disturbance zone is within an upper half of the networked layer of pulp. However, the method of the invention may still be implemented where the disturbance zone 16 is within an upper 30% of the networked layer of pulp, an upper 10% of the networked layer of pulp, or even at or adjacent the top of the networked layer of pulp.

Figure 3:
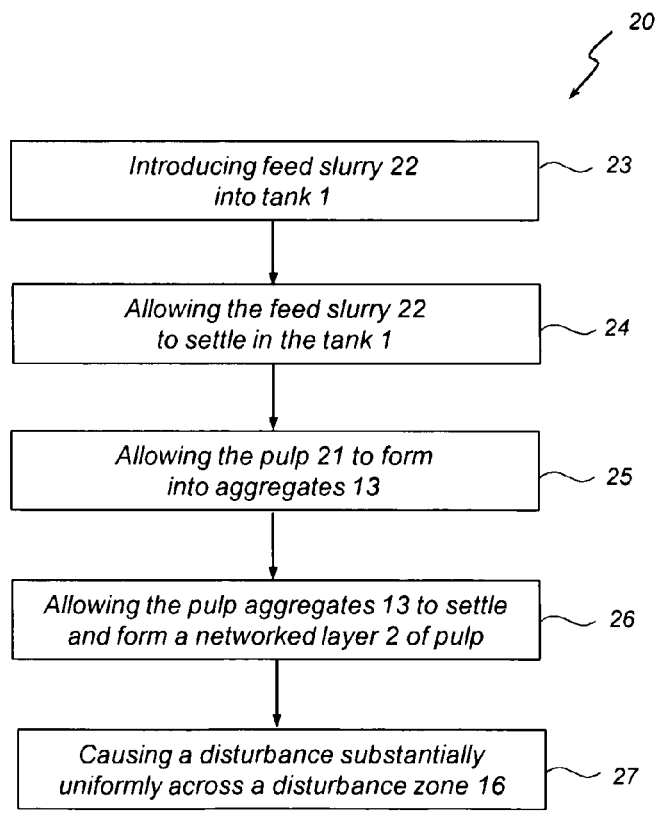
FIG. 3 is a schematic diagram of a method according to one embodiment of the invention.

A first embodiment of the invention is schematically illustrated in FIG. 3, where corresponding features have been given the same reference numerals. The method 20 of separating pulp 21 from a feed material in the form of a feed slurry 22 within a tank 1 comprises the steps of introducing the feed material into the tank (step 23), allowing the feed material to settle in the tank (step 24), allowing the pulp 21 to form into aggregates 13 (step 25), allowing the pulp aggregates 13 to settle towards the bottom of the tank and form a networked layer 2 of pulp (step 26) and causing a disturbance substantially uniformly across a disturbance zone 16 in an upper region 17 of the networked layer 2 (step 27), so as to disrupt the networked pulp 3 in the disturbance zone 16 within a predetermined period of time. This releases entrained liquid 14 from the networked pulp 3 in the disturbance zone 16 and increases the relative density of the pulp 18 below the disturbance zone. The entrained liquid 14 then escapes upwardly from the networked pulp layer 2 through the hindered zone 4 and/or free settling zone 6 and into the clarified zone 8.

In particular, it has been discovered that an advantageous implementation of the disturbance causing step 27 is to apply shear substantially uniformly across the disturbance zone 16. The mechanism by which shear is applied in the disturbance causing step 27 can take a number of forms. For example, one shearing mechanism is to use liquid or gas jets to inject a liquid or gas towards, into or through the disturbance zone 16 to apply shear substantially uniformly across the disturbance zone. Similarly, a fluidiser can direct fluid flow towards, into or through the disturbance zone 16 to apply shear substantially uniformly across the disturbance zone. Other shearing mechanisms include subjecting the disturbance zone 16 to mechanical vibration using a suitable vibratory apparatus or ultrasonic impulses to apply shear substantially uniformly across the disturbance zone. While these shearing mechanisms are suitable for implementing the disturbance causing (shearing) step 27 in the method of the invention, the inventors have determined that a preferred shearing mechanism is mechanical agitation, advantageously by way of a shearing device that moves through the disturbance zone 16 to apply shear substantially uniformly across the disturbance zone. In one preferred form, the shearing device is rotated in the tank in accordance with the disturbance causing (shearing) step 27.

Figure 4:
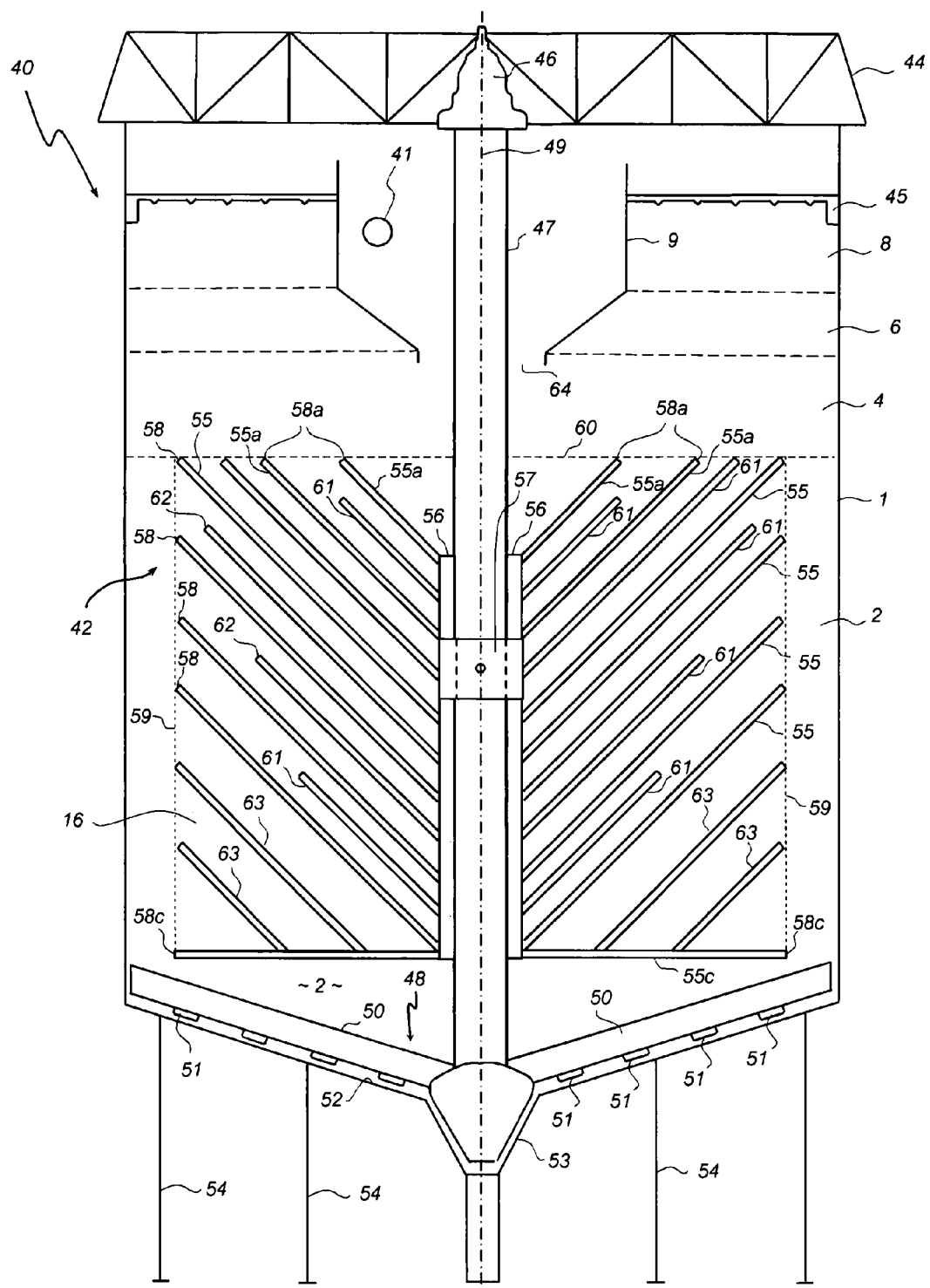
FIG. 4 is a cross-sectional view of a separation device according to one embodiment of the invention.

Referring to FIG. 4, a separation device in accordance with one embodiment of the invention is illustrated, where corresponding features have been given the same reference numerals. The separation device is in the form of a thickener 40 and comprises a tank 1, an inlet 41 for feeding the feed slurry 22 at a flux into the tank via a centrally located feedwell 9, and a disturbance causing device in the form of a shearing device 42 causing a disturbance substantially uniformly across a disturbance zone 16 in an upper region 17 of the networked layer 2, so as to disrupt the networked pulp 3 in the disturbance zone 16 within a predetermined period of time, thereby releasing entrained liquid 14 from the networked pulp in the disturbance zone 16 and increasing the relative density of the pulp 18 below the disturbance zone.

In this embodiment, the thickener 40 is configured as a bridge-type thickener, having a supporting bridge 44 located diametrically across and above the tank 1 and a circumferential overflow launder 45. A central drive assembly 46 operates a central drive shaft 47 to rotate a rake assembly 48 and the shearing device 42 about a central axis 49 of the tank 1. The rake assembly 48 comprises rake arms 50 having scraper blades 51 extending downwardly towards the bottom 52 of the tank 1 to move settled and compacted pulp towards an underflow outlet 53. The entire tank 1 is supported by columns 54.

The shearing device 42 comprises a plurality of radially outwardly extending shearing elements in the form of pickets 55 that are connected to parallel stems 56 from which the pickets extend at an angle of inclination of approximately 45° to a vertical plane parallel to the central axis 49. The shearing device 42 also has a collar attachment 57 fixing the plurality of pickets 55 to the drive shaft 48. The pickets 55 are arranged in a tree-like array or structure so that their tips 58 are substantially in line with a vertical line 59. Four smaller pickets 55a are disposed at the top of the shearing device 42 so that the top two pickets 55a have their tips 58a substantially aligned with a horizontal plane 60 coincident with the boundary between the pulp bed 2 and the hindered zone 4, together with the uppermost of the pickets 55. A pair of lower horizontal pickets 55c terminate so that their tips 58c are substantially aligned with the vertical lines 59. Thus, the pickets 55 define a substantially rectangular shape having a width that substantially approximates to the diametrical cross-section of the thickener tank 1. A set of progressively shorter pickets 61 alternate between the longer pickets 55 with their respective tips 62 pointing upwardly. Additionally, supplementary pickets 63 extend parallel to the pickets 55 and 61 from the horizontal pickets 55c. The shorter pickets 61 and supplementary pickets 63 provide an increased number of shear events closer towards the rotational axis, where the linear velocity of the pickets is reduced.

In operation, a suspension of pulp in the form of a slurry is fed into the feedwell 9 through the inlet 41. The slurry may be fed tangentially into the feedwell 9 to improve the residence time for mixing and reaction with reagents, such as flocculants, that help create the aggregates or "flocs" of higher density pulp solids. Tangential entry also assists in dissipating the kinetic energy of the slurry in the feedwell 9, thus promoting settling within the tank 1. The suspension then flows downwardly under gravity out of a restricted outlet 64 into the tank 1, where it settles to form the various zones of material, including the networked pulp layer 2, hindered zone 4, free settling zone 6 and clarified zone 8. The relatively dense networked pulp layer 2 displaces the upper clarified zone 8 of relatively dilute liquor towards the top of the tank 1. The thickened pulp is drawn off through the underflow outlet 10, while the dilute liquor is progressively drawn off through an overflow launder 45.

As the depth of the networked pulp layer 2 increases to encompass the disturbance zone 16 as part of its upper region (around the upper 75% to 80% of the networked pulp layer 2), the shearing device 42 rotates around the tank 1, causing the pickets 55, 61 and 63 to apply shear substantially uniformly across the disturbance zone 16 to the pulp aggregates or particles descending from the feedwell outlet 64 into the disturbance zone 16. As discussed above, the disruption of the networked pulp in the disturbance zone 16 results in the release of trapped liquid or liquor and increases the relative density of the pulp below the disturbance zone 16. The denser pulp 18 below the disturbance zone 16 tends to reform a substantially higher density relative to the pulp above the disturbance zone, and thus settle quickly without excessive fractionation and detrimentally affect the settling process. The shear is applied either as direct "hits" from the pickets 55, 61 and 63 or as disturbances in the zones of turbulence associated with the wake of the passage of the pickets 55 through the disturbance zone 16.

The inventors have found that in the invention, the specific configuration of the shearing device does not directly affect the optimal shear profile that is obtained from applying shear uniformly across the disturbance zone 16. It will be appreciated that the invention can thus be implemented to any shearing device employed in a separation device, and so is not limited to a particular shearing device configuration. The inventors have, however, determined that there are several preferred configurations for the shearing device as they are generally more efficient in achieving an optimum shear profile, which are described below.

Thus, the inventors have discovered that the optimal amount of shear that results in improved and optimal thickener performance can be achieved primarily where the shearing device configuration results in at least one of, or a combination of, the following:

(1) a substantially uniform cumulative shear being applied to the networked pulp in the disturbance zone within the predetermined period of time;

(2) a substantially uniform average shear being applied to the networked pulp in at least two intervals between shearing elements spaced apart along at least one arm of the shearing device, along a line parallel to or coincident with the at least one arm; and (3) a substantially uniform number of shear events being applied to the networked pulp in the disturbance zone within the predetermined period of time.

The separation device 40 of FIG. 4 has a shearing device 42 that implements the concept of substantially uniform cumulative shear, which is discussed in more detail below with reference to FIGS. 5A and 6A, where corresponding features have been given the same reference numerals.

If a pulp aggregate 13 or particle 12 is settling at a distance l from the centre at a rate v m s$^{-1}$, and the depth of the disturbance zone 16 is d m, then the time taken by the particle to move through the disturbance zone 16 is represented by $$\theta = d/v \text{ seconds} \tag{1}$$

Assuming that the disturbance is caused by the application of shear by a shearing device 69 having, for example, four rotating radial arms 70 (carrying angled pickets 72) mounted on a centre shaft 47 travelling at a rotational speed of w revolutions per second, the number of "passes" in time θ is represented by:

$$n = 4 \cdot \theta \omega \tag{2}$$

This number of passes can also be regarded as the number of shear "events" experienced by each pulp aggregate 13 or particle 12 as the shearing pickets 72 move past. In this context, the shear applied by any individual picket not only includes a direct "hit" of the pulp aggregate by the picket but the disturbance or "shaking" of the pulp aggregate caught in the wake of the passage of the picket 72, which the inventors call a "zone of turbulence". These zones of turbulence are sufficient to apply a shear force to the aggregate or pulp particle, albeit less than the amount of shear directly applied by the pickets 72.

Figure 5A:
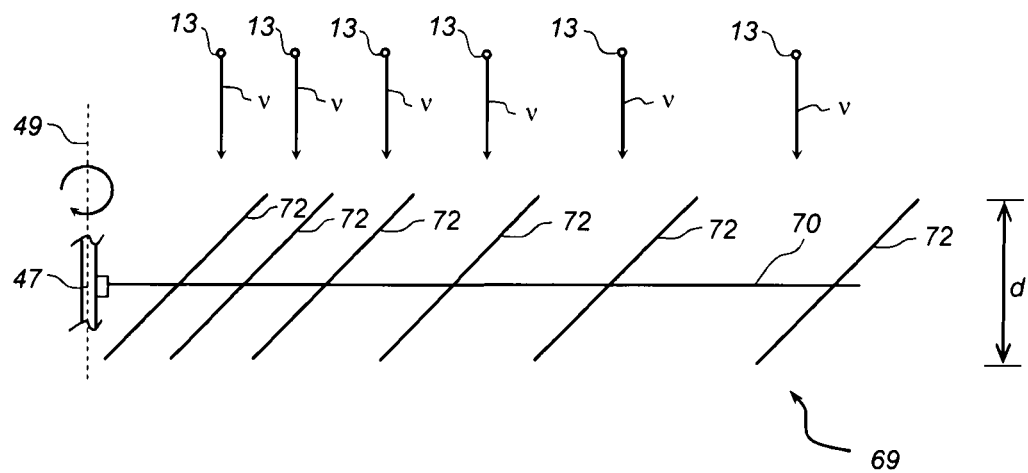
FIGS. 5A and 5B are respective schematic partial cross-sectional and plan views of a shearing device for a separation device according to another embodiment of the invention.
Figure 6A:
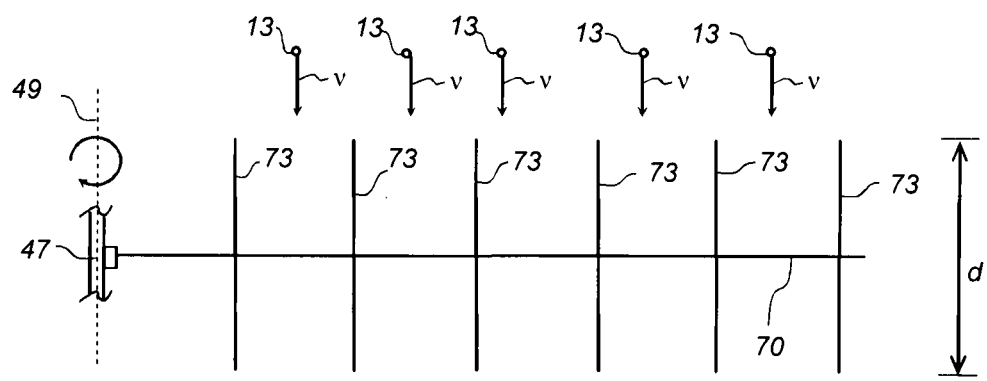
FIGS. 6A and 6B are respective schematic partial cross-sectional and plan views of a dewatering picket assembly in the prior art.

Comparing the shearing picket configurations of FIGS. 5A and 6A, the probability of a pulp aggregate or particle being subjected to varying shear rates during the n shearing events is greater for the configuration of FIG. 5A than the prior art configuration of FIG. 6A, assuming that the number of shear events is significantly greater than 1. Hence, the total shear applied to a layer of settling pulp aggregates or particles becomes more uniform as n increases and the angle of the pickets φ is increased. However, the inventors believe that increasing φ several degrees beyond 45° is not beneficial because of fluid flow considerations, and substantially uniform cumulative shear is optimally obtained by inclining the shearing elements, such as the pickets 72, at approximately 45° to the vertical.

With reference to the embodiment of FIG. 4, in operation the shearing device 42 is rotated about the central axis 49 by the central drive shaft 47 to apply a substantially uniform cumulative shear to the pulp passing through disturbance zone 16 of the pulp bed 2 in accordance with principles described above. That is, the shearing device 42 makes several passes through the disturbance zone 16 and the pickets 55, 61 and 63 are angled so that the pulp aggregates or particles are subjected to several varying shear events, either by way of a direct "hit" or being caught in a zone of turbulence, as indicated by equations (1) and (2). The shorter pickets 61 and supplementary pickets 63 provide an increased number of varying shear events closer towards the central axis 49, where the linear velocity of the pickets is reduced. Thus, the cumulative shear applied to pulp exiting the disturbance zone 16 is substantially uniform or the same.

Additionally, the inventors have discovered that where the shearing device comprises a plurality of shearing elements spaced apart along at least one arm to define respective intervals therebetween, an optimal amount of shear is obtained by providing a substantially uniform average shear in at least two intervals along a line parallel to or coincident with the at least one arm, and more preferably all the intervals between the shearing elements along the line.

In most cases, the shearing device will employ two or more outwardly extending radial arms and thus the substantially uniform average shear applied to the networked pulp in the intervals between the shearing elements will be along a radial line in alignment with the radial arms. In other words, the line along which the substantially uniform average shear is applied in the intervals generally corresponds to the profile of the shearing device when viewed in plan. However, it will be appreciated that where the shearing device is partially or fully non-linear in cross-section, the line will correspondingly be partially or fully non-linear in conformity with that cross-section of the shearing device. For example, the shearing device may have arms that are sinuous, partially curved or even zigzag-like in shape, in which case the substantially uniform average shear would be applied along a sinuous, partially curved or even zigzag-like line, respectively.

Figure 6B:
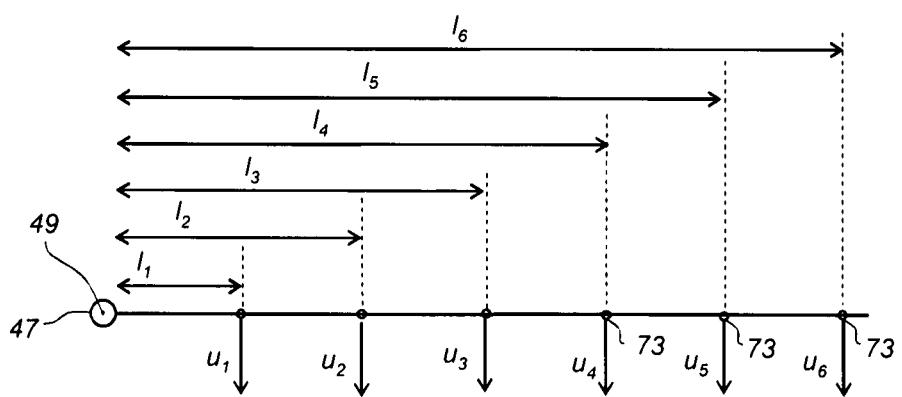
Figure 7:
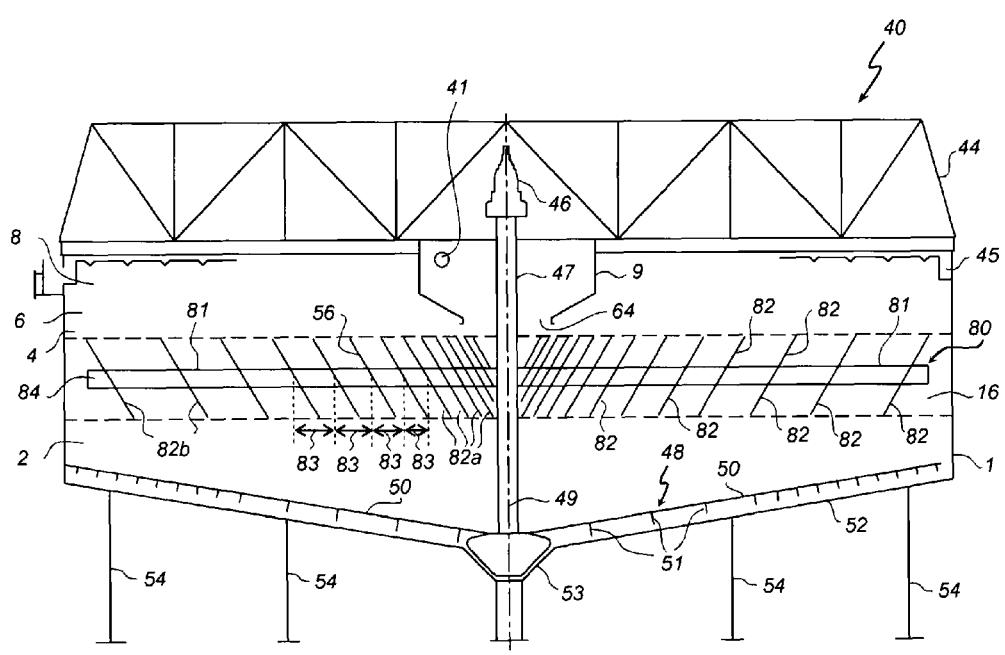
FIG. 7 is a cross-sectional view of a separation device according to another embodiment of the invention.

This concept of applying a substantially uniform average shear is discussed in more detail below with reference to FIGS. 5B, 6B and 7. FIG. 7 illustrates another embodiment of the invention where corresponding features have been given the same reference numerals. In this embodiment, the thickener 40 has a shearing device 80 comprising two outwardly extending radial arms 81, with a plurality of shearing elements in the form of angled linear rods or pickets 82 mounted to each radial arm. The pickets 82 are inclined at an angle of approximately 45° with respect to a vertical plane and are spaced at uneven intervals 83 to each other, with the interval between the pickets progressively increasing from an axis of rotation 49 to respective outer edges 84 of the radial arms 81. This progressive increase in the intervals 83 is in proportion to the distance of their associated pickets 82 from the axis of rotation 49. As a result, the inner pickets 82a are densely located relative to each other towards the rotational axis 49, compared to the outer pickets 82b near the outer edges 84.

The uneven spacing of the pickets 82 along the radial arms 81 results in the average shear in the intervals 83 between each pair of pickets 82 being substantially the same or uniform along a radial line defined by the radial arms 81. In particular, the inventors have determined that the shear applied to pulp aggregates or particles is generally a function of the linear speed or velocity of the pickets (or other shearing elements) and the distance between the picket and the pulp aggregate or particle. Since the linear velocity of the picket is also a function of the rotational speed of the drive shaft and the distance of the picket from the axis of rotation, the inventors have determined that as the distance from the axis of rotation increases, the linear velocity of the picket increases proportionately. This relationship between the shear and the distance between pickets is described in more detail below with reference to FIGS. 5B and 6B.

The shear rate applied to a pulp particle or aggregate by a moving picket is generally expressed by:

$$\mathbf{\gamma} = k \cdot u_l / \xi \qquad (3)$$

where $\mathbf{\gamma}$ is the shear rate in
$u_l$ is the linear velocity of the picket in $ms^{-1}$,
$\xi$ is the distance between the picket and the pulp aggregate or particle in metres, and
k is a constant, which is a function of material properties of the pulp.

Also, $$u_l = 2\pi\omega \cdot l \qquad (4)$$

where ω is the rotational speed of the shaft in $s^{-1}$; and
l is the distance from the centre in metres.

Figure 5B:
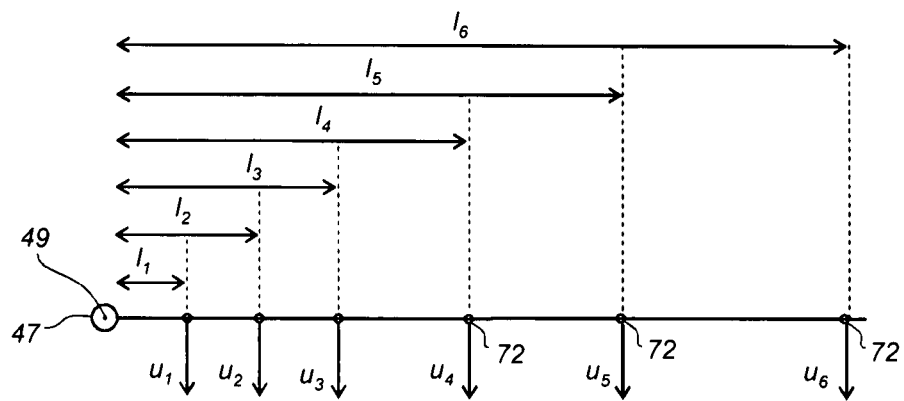

Referring to FIGS. 5A and 5B, equations (3) and (4) indicate that as the distance $l_1, l_2, l_3, l_4, l_5, l_6$ from the axis of rotation 49 increases, the linear velocity of the picket 82 increases proportionally as $u_l(u_1, u_2, u_3, u_4, u_5, u_6)$ a product of $2\pi\omega$ and $l_1, l_2, l_3, l_4, l_5, l_6$, respectively. For a set of particles 12 (or aggregates 13) between any two pickets 82, in order to ensure that the average shear is substantially the same or uniform along the line parallel or coincident with the radial arms (ie. along the length of the radial arm 81), the spacing (ξ) between the pickets and the aggregates needs to increase proportionally to the linear velocity. That is, the distance or gap $(l_2-l_1, l_3-l_2, l_4-l_3, l_5-l_4, l_6-l_5)$ between the pickets 82 is in proportion to their distance $l_1, l_2, l_3, l_4, l_5, l_6$ from the axis of rotation 49 along the radial arm 81. Hence, the requirement for a substantially constant or uniform average shear can be met by increasing the distance or gap between the pickets in proportion to their distance along the radius. By way of contrast, this substantially constant or uniform average shear cannot be achieved by means of a set of evenly spaced pickets or rods fixed to a radial arm, since the linear speed of any such rod is proportional to its distance from the centre, as illustrated in FIGS. 6A and 6B.

The configuration of the shearing device 80 results in a substantially uniform cumulative shear being applied to pulp in the disturbance zone 16 over a predetermined period of time, equivalent to the pulp entering and exiting disturbance zone 16. Also, a substantially uniform average shear is applied in the intervals 83 between the pickets 82 along a radial line defined by the radial arms 81. Specifically, the shearing device 80 makes several passes through the disturbance zone 16 and the pickets 82 are angled so that the pulp aggregates or particles receive several varying shear events, either by way of a direct "hit" or being caught in a zone of turbulence.

Thus, the cumulative shear applied to pulp in the disturbance zone 16 over the predetermined period of time is substantially uniform or the same.

In addition, the outer pickets 82b provide a higher shear force than the inner pickets 82a due to the outer pickets 82b having a greater linear velocity, as indicated by equations (3) and (4). However, due to the denser distribution of the inner pickets 82a compared to the outer pickets 82b, aggregates closer towards the axis of rotation 49 of the shearing device 80 have a more uniform shear profile over a smaller range of shear (in the amount of shear) than that applied to aggregates further from the axis of rotation 49. The shear profiles in the intervals 83 toward the outer edges 84 of the radial arms 81 are relatively less uniform and extend over a larger range or amplitude of shear than the shear profiles closer towards the axis of rotation 49. However, due to the differential spacing, the average shear applied to the pulp aggregates in the intervals 83 defined between the pickets 82 will be substantially uniform across the radial arms 81.

Thus, both the cumulative shear from the total number of shear events and the average shear between the pickets 82 are each substantially uniform (although not generally the same value) due to the arrangement of the angled pickets 82 on the radial arms 81. This causes the disruption of the networked pulp to release trapped liquid, improving the overall density of the pulp bed 2, and to create denser pulp 18 that settles quickly in the pulp bed 2, thus improving the separation efficiency.

Furthermore, the inventors have unexpectedly discovered that the application of a substantially uniform number of shear events across the disturbance zone 16 will also achieve an optimal shear profile that disrupts the networked pulp, thereby releasing trapped liquid 14 and increasing the density of the pulp 18 below the disturbance zone. The inventors have discovered that so long as the number of shear events received by the pulp passing through the disturbance zone 16 is substantially uniform over a predetermined period of time (for example, the period it takes for an x number of revolutions), then shear is being applied substantially uniformly across the disturbance zone, as indicated by equation (2). Thus, the necessary disruption to the networked pulp is obtained, along with the associated release of trapped liquid 14 and increase in the density of the pulp 18 below the disturbance zone 16. It follows that a uniform number of shear events does not require substantially uniform cumulative shear or substantially uniform average shear to be applied at the same time, since the number of shear events is significant and not the amount of each shear event.

Figure 8A:
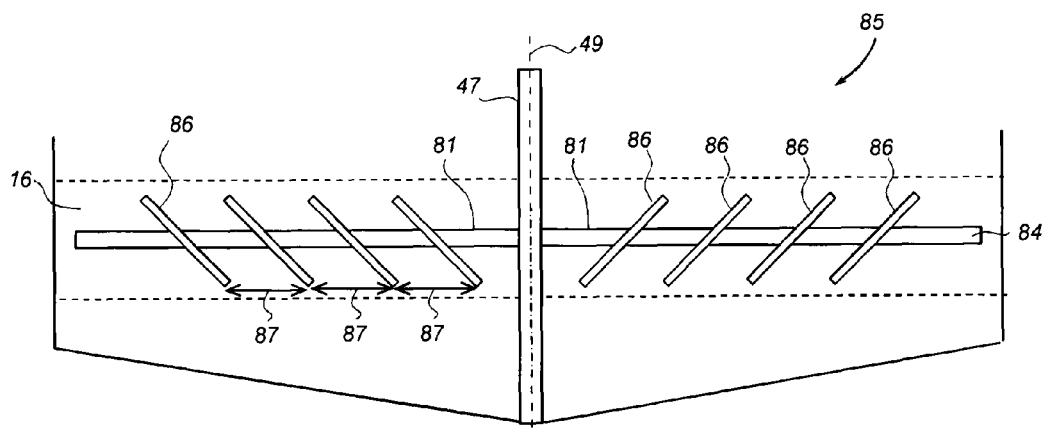
FIG. 8A is a cross-sectional view of separation device according to a further embodiment of the invention.
Figure 8B:
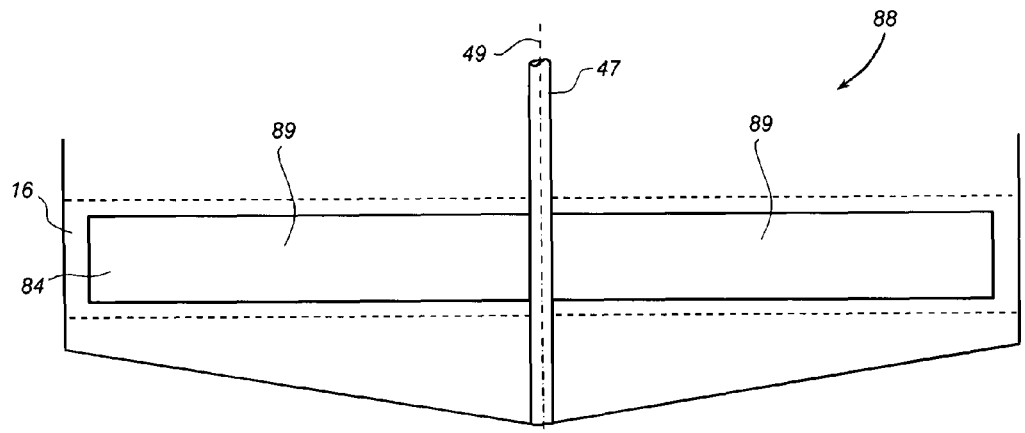
FIG. 8B is a cross-sectional view of separation device according to yet another embodiment of the invention.
Figure 8C:
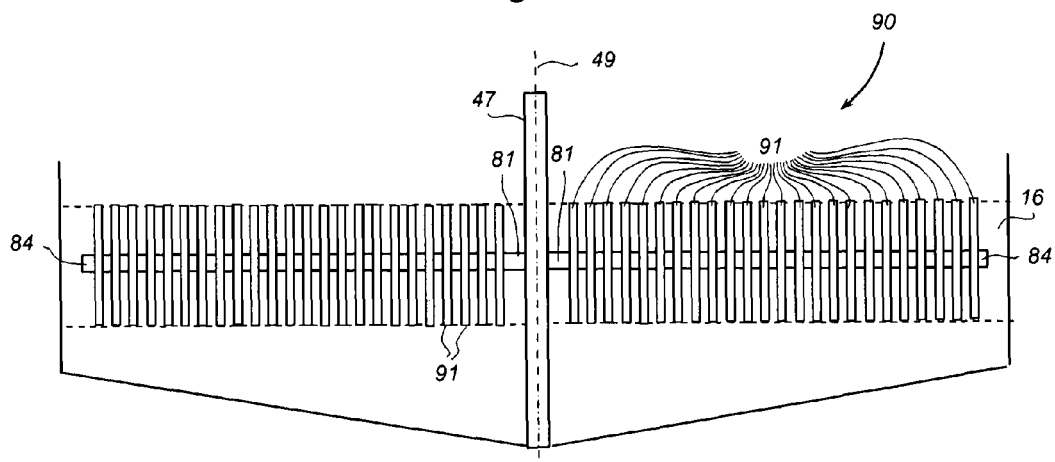
FIG. 8C is a cross-sectional view of separation device according to a further embodiment of the invention.

Accordingly, FIGS. 8A, 8B and 8C illustrate shearing devices that achieve a uniform number of shear events without applying substantially uniform cumulative shear or substantially uniform average shear.

In FIG. 8A, where corresponding features have been given the same reference numerals, the shearing device 85 has two outwardly extending radial arms 81, with a plurality of shearing elements in the form of angled linear rods or pickets 86 mounted to each radial arm. The pickets 86 are inclined at an angle of approximately 45° with respect to a vertical plane and are spaced at even intervals 87 to each other from an axis of rotation 49 to respective outer edges 84 of the radial arms 81. The shearing device 85 makes several passes through the disturbance zone 16 and the pickets 86 are angled so that the networked pulp aggregates 13 or particles 12 receive the same number of shear events between entry and exit of the pulp into and out of the disturbance zone 16. However, the even spacing of the pickets 86 means that the average shear in the intervals 87 between each pair of pickets 86 is not the same or uniform along a radial line defined by the radial arms 81. In addition, as the pickets 86 are not arranged to compensate for the progressive increase in linear velocity of the pickets 86 towards the outer edges 84 of the radial arms 81, and thus the amount of shear, then the cumulative amount of shear is not the same or uniform.

Similarly, in FIG. 8B, where corresponding features have been given the same reference numerals, the shearing device 88 has two outwardly extending radial shearing arms 89 that apply shear across their respective lengths, and thus substantially uniformly across the disturbance zone 16. As there are no shearing elements other than the radial arms 89 that occupy the depth of the disturbance zone 16, there are no intervals for average shear nor any way to compensate for the progressive increase in linear velocity of the shearing arms 89 towards their respective outer edges 84.

In FIG. 8C, where corresponding features have been given the same reference numerals, the shearing device 90 has two outwardly extending radial arms 81, with a plurality of shearing elements in the form of substantially vertical linear rods or pickets 91 mounted to and equispaced along each radial arm. In this embodiment, the pickets 91 are grouped closely together in a tight concentration to increase the area of the disturbance zone 16 to approximately 50% of the cross-sectional area of the upper region 17, and hence 50% of the networked pulp in the upper region, that receives a shear event during a pass of the shearing device 90. The shearing device 90 makes several passes through the disturbance zone 16 and the concentration of pickets 91 ensures that 50% of the networked pulp aggregates 13 or particles 12 receive the same number of shear events between entry and exit of the pulp into and out of the disturbance zone 16. As the pickets 91 are equispaced along the radial arms 81, there is no uniform average shear between each pair of pickets 91 along a radial line defined by the radial arms 81. In addition, the pickets 91 are not arranged to compensate for the progressive increase in linear velocity of the pickets 91 towards the outer edges 84 of the radial arms 81, and hence, the amount of shear. Consequently, the cumulative amount of shear is not the same or uniform. In one variation, another set of radial arms 81 are provided with pickets 91 offset to the pickets 91 on the first set of radial arms 81 to apply shear in the intervals and thus increasing the disturbance zone 16 to encompass the entire upper region 17 (100%), and thus apply shear to the entire (100%) networked pulp passing through the upper region.

The inventors have unexpectedly and surprisingly discovered that it is particularly advantageous for the shearing device 42 to be located in the upper half of the pulp bed 2, as the liquid is readily able to escape the pulp bed 2 into the clarified zone 8 of dilute liquor. By way of contrast, applying a shear force in only the bottom half of the pulp bed 2 will release liquid upwardly, however, the undisturbed upper layer of the pulp bed tends to produce a blanketing effect that hinders or even prevents further upward migration of the liquid into the clarified zone 8. Thus, the improved efficiency attained by the shearing device 42 is not as effectively achievable in the bottom half of the pulp bed 2, as it is in the upper portion, particularly in the upper half. In addition, the shear applied to the disturbance zone is not constrained by the need to minimise the rotation speed of the shearing device 42, as it has been unexpectedly and surprisingly found that a greater amount of shear produced by the increased rotational speed does not adversely affect the compaction of the pulp solids in the pulp bed 2. The inventors also contemplate that this advantageous effect can be extended to include a portion of the hindered zone 4 above the pulp bed 2, especially a lower portion of the hindered zone.

It has also been determined that an optimal shear can be obtained by either providing a substantially uniform cumulative shear, a substantially uniform average shear between the shearing elements or a substantially uniform number of shear events independently of each other, or a combination of any two or all three.

Figure 9:
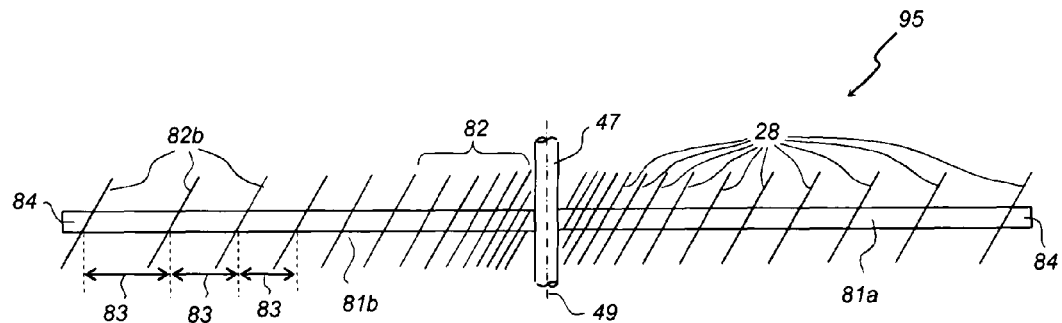
FIG. 9 is a cross-sectional view of another shearing device for use in the separation device of FIG. 7.

Additional non-limiting examples of shearing devices for use in the method and separation device of the invention are briefly discussed below in relation to FIGS. 9 to 22B, where corresponding features have been given the same reference numerals. In each of these embodiments, the shearing devices operate substantially the same way as described in relation to the embodiments of FIGS. 4 and 7, unless otherwise indicated.

in FIG. 9, the shearing device 95 has angled pickets 82 arranged in an asymmetrical configuration with respect to the axis of rotation 49. The inventors believe that the asymmetric configuration or array further increases the probability of pulp aggregates or particles experiencing multiple varied shear events when passing through the disturbance zone 16 to provide a substantially uniform cumulative shear, in addition to the angling of the pickets 82 at approximately 45° with respect to a vertical plane perpendicular to the radial arm 81 at the respective point of connection. This is because the pickets on one radial arm 81a will apply shear to a different part of the disturbance zone 16 to the pickets 82 on the other radial arm 81b. The pickets 82 are also spaced at uneven intervals 83 that progressively increase in proportion to the distance of their associated pickets from the rotational axis 49 to the outer edges 84 of the radial arms 81 so that the average shear in the intervals 83 between the pickets 82 is substantially the same. This results in the intervals between the pickets 82 progressively increasing from the central axis 49 to the outer edge 84 of each radial arm 81.

Figure 10:
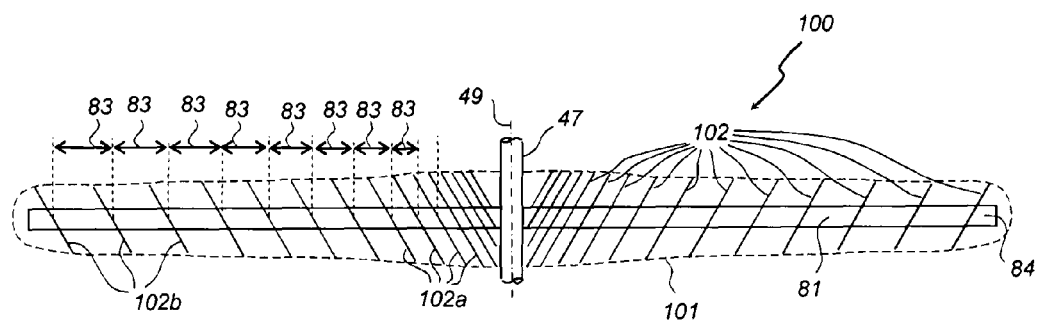
FIG. 10 is a cross-sectional view of a further shearing device for use in the separation device of FIG. 7.

In FIG. 10, the shearing device 100 has a tapered profile 101 that is defined by angled pickets 102 of differing lengths, together with the radial arms 81. The pickets 102 progressively decrease in length from the axis of rotation 49 to the respective outer edges 84 of the radial arms 81. By progressively reducing the length of the pickets 102 at the outer edges 84, the shearing device 100 reduces the amount of shear applied by the outer pickets 102b. In this embodiment, the shearing device 100 provides a substantially uniform cumulative shear but does not provide a uniform average shear in the intervals between the pickets 102 along a radial line, because the pickets 102 have been spaced at intervals 83 to compensate for their reduced length. While this results in the average shear varying between the pickets 102, the cumulative shear from this picket configuration is substantially uniform, since the increased shear due to the additional pickets 102b at the outer edges counterbalances the reduction in picket length.

Figure 11:
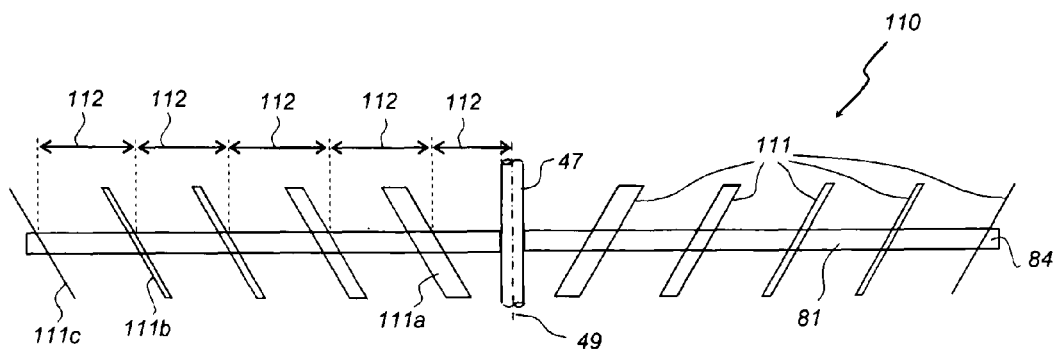
FIG. 11 is a cross-sectional view of yet another shearing device for use in the separation device of FIG. 7.

In FIG. 11, the shearing device 110 has pickets 111 that vary in thickness and are spaced at intervals 112. Since the shape of the pickets dictates the amount of shear applied to the pulp aggregate, a picket with an increased width will produce a higher amount of shear than a picket having a smaller width, if they have the same linear velocity. Therefore, in this embodiment, the pickets 111 progressively decrease in thickness from the rotational axis 49 to the outer edges 84, with the inner pickets 111a having a greater thickness or width compared to the outer pickets 111b and 111c. Essentially, the inner thicker pickets 111a are equivalent to the increased number of pickets 82a in the shearing device of FIGS. 7, 9 and 10. Thus, the shearing device 110 provides a substantially uniform cumulative shear to the pulp exiting the disturbance zone 16. Moreover, uniform average shear can be obtained in the intervals 112 between the pickets 111 by suitably progressively decreasing their thickness from the central axis of rotation 49 to the outer edges 84.

Figure 12:
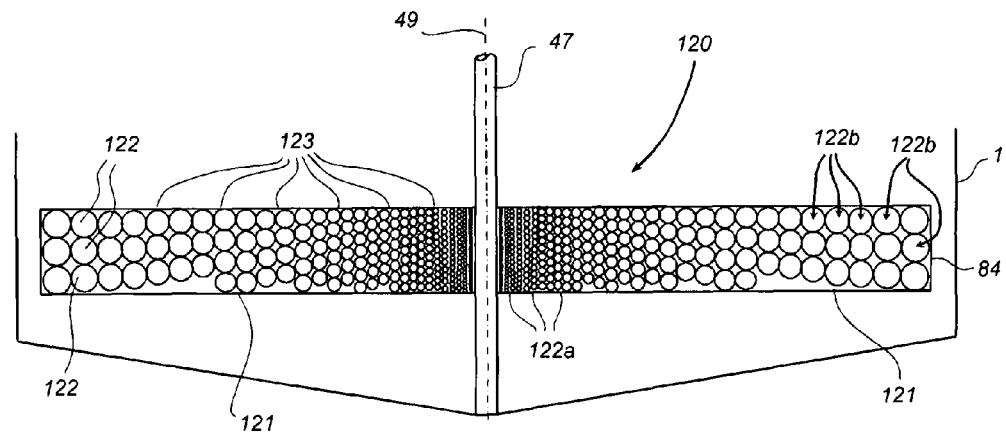
FIG. 12 is a cross-sectional view of a separation device according to a yet further embodiment of the invention.

Referring to FIG. 12, the shearing device 120 comprises two substantially vertical plates 121 each having a series of holes or apertures 122 that are substantially aligned vertically in "columns" 123. Unlike other previously described shearing devices, the holes 122 apply shear to the pulp passing through the disturbance zone 16. This is because the movement of the plates 121 causes the pulp aggregates or particles to be forced or "squeezed" through the holes 122, thus resulting in the pulp aggregates or particles experiencing a shear force applied by the edges of the holes 122 and a more concentrated distribution of shear within the smaller holes 122a. In addition, the holes or apertures 122 progressively increase in diameter from the axis of rotation 49 to the respective outer edges 84 of the plates 121 to provide the substantially same effect as the less dense distribution of the outer pickets 82b in the shearing device of FIG. 8. In this case, the smaller holes 122a toward the rotational axis 29 travel at a lower velocity compared to the larger holes 122b toward the outer edges 31, but have a more concentrated distribution of shear than the larger holes 122b due to their smaller diameter.

Thus, as the shearing device 120 rotates, the pulp particles or aggregates closer to the axis of rotation 49 experience a more uniform series of shear events that vary over a smaller range or amplitude of shear than the pulp aggregates or particles at the outer edges 84 of the shearing plates 121 due to the higher number, decreased size and lower linear velocity of the inner holes 122a. The increased areas of the outer holes 122b are designed to offset their increased linear velocity at the outer edges 84 compared with the lower linear velocity of the smaller inner holes 122a. Hence, the outer holes 122b provide a less uniform shear profile over a larger range or amplitude of shear compared to the shear profile applied by the inner holes 122a to aggregates closer towards the axis of rotation 49. In other words, the size of the holes 122 progressively increases from the rotational axis 49 to the outer edges 84. Thus, the shearing device 120 provides a substantially uniform cumulative shear to the pulp exiting the disturbance zone 16.

It will be appreciated that the holes 122 need not be organised in regular columns 123, but can be arranged in other configurations. For example, the holes 122 could be aligned at an angle to the vertical to define angled columns or even randomly arranged provided that the hole diameter progressively increases towards the outer edges 84. In one particular variation, the diameter size of the holes 122 can be suitably adjusted to obtain uniform average shear in the intervals as defined by the respective diameters of the holes, namely by ensuring that the progressively larger holes are located in proportion to their distance from the axis of rotation 49. In another variation, the diameter size of the holes 122 are substantially the same or uniform, thus resulting in a substantially uniform number of shear events being applied to the networked pulp in the disturbance zone.

Figure 13:
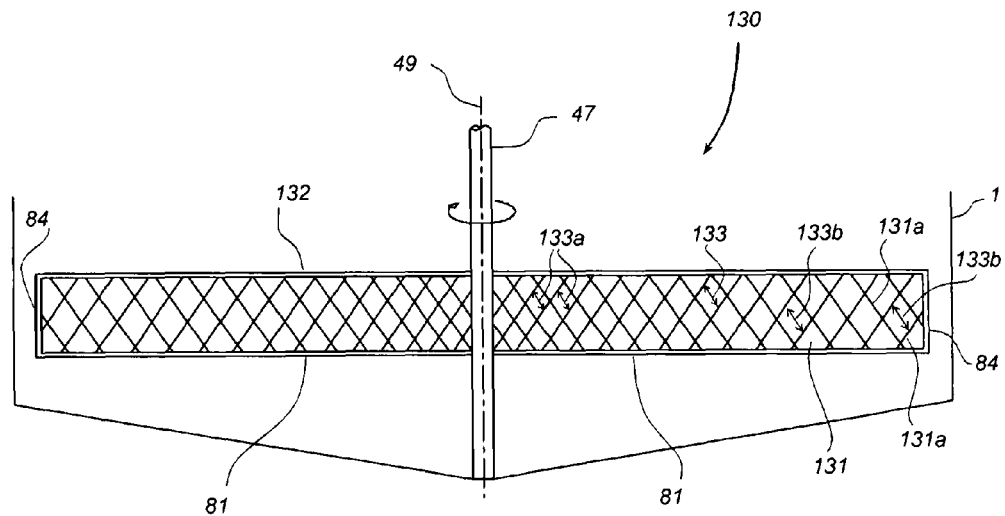
FIG. 13 is a cross-sectional view of a separation device according to a further embodiment of the invention.

Referring to FIG. 13, the shearing device 130 is formed with a mesh 131 having a diamond pattern, structurally supported by a border 132 defining the outer perimeter of the mesh. The spacing or interval 133 between each mesh element 131a progressively increases in proportion to the distance of their associated mesh elements from the axis of rotation 49 to the outer edges 84 such that the inner intervals 133a are less than the outer intervals 133b, thus achieving a similar effect as the uneven intervals 83 between the pickets 82 in the shearing device of FIG. 8. It will be appreciated that other patterns can be used for the mesh 131, for example, hexagonal, octagonal, and other polygonal shaped patterns or even combinations of polygonal shapes, whether regular or randomised. The inventors have found that both the cumulative shear applied by the shearing device 130 and the average shear in the intervals 133 between each part of the mesh 131 are each separately substantially uniform. In one variation of this embodiment, the shearing device 130 has the same mesh size, thus resulting in a substantially uniform number of shear events to the networked pulp in the disturbance zone 16.

Figure 14:
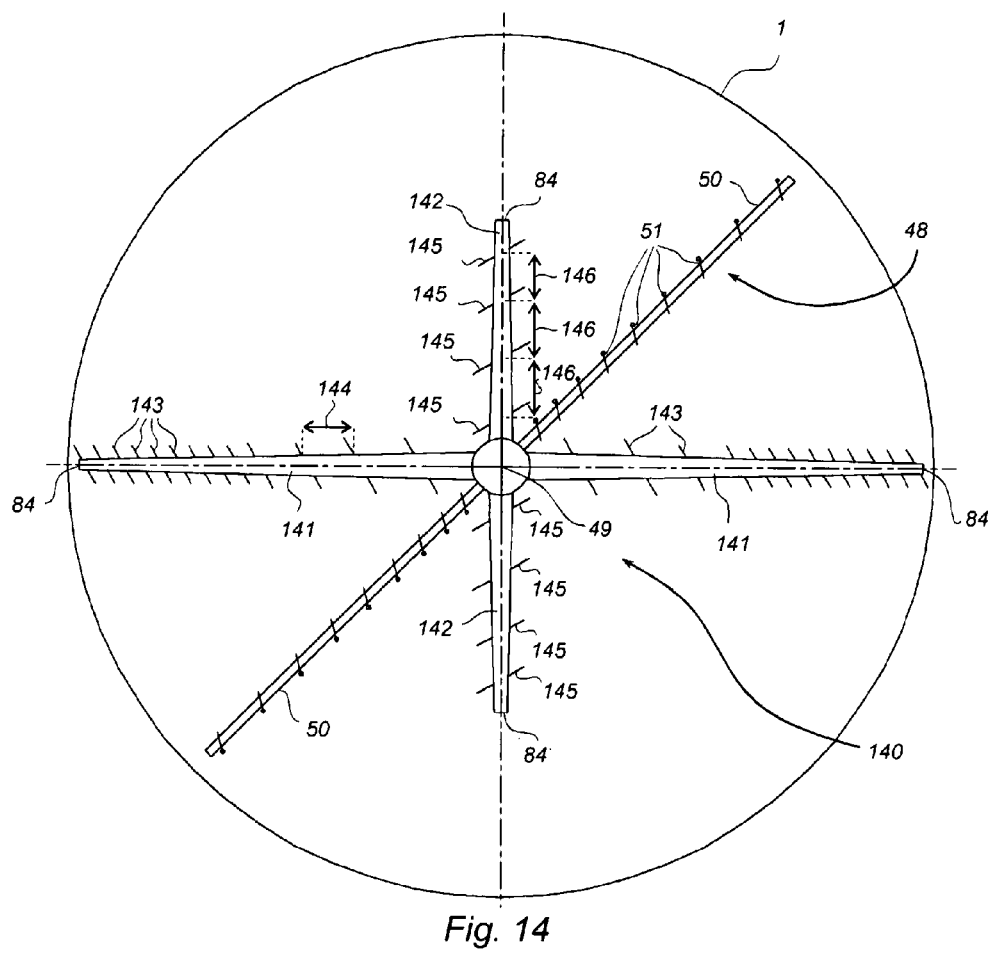
FIG. 14 is a plan view of a separation device according to a further embodiment of the invention.

Referring to FIG. 14, the shearing device 140 is formed with two pairs of radial arms, one pair of radial arms 141 being longer than the other pair of radial arms 142. The picket configuration on the radial arms 141 has a tapered profile due to the progressively decreasing length of the angled pickets 143 and is arranged asymmetrically about the axis of rotation 49. However, unlike any of the previous embodiments, the number of pickets 143 progressively increases from the central axis of rotation 49 to the respective outer edges 84 as the uneven intervals 144 progressively decrease. The other pair of radial arms 142 have pickets 145 arranged asymmetrically about the axis of rotation 49, although at even intervals 146 rather than uneven intervals so that the pickets 145 apply shear in the intervals 144 between the pickets 143 of the longer radial arms 141. This increases the probability of the pulp aggregates or particles experiencing several shear events as they pass through the disturbance zone 16 of the pulp bed 2.

As a result, neither the longer radial arms 141 nor the shorter radial arms 142 individually provide a uniform cumulative shear. However, the second pair of radial arms 142 is arranged to compensate for the first pair of radial arms 141 so that the shearing device 140 achieves a substantially uniform cumulative shear effect. The inventors also believe that this effect is further enhanced by using different configurations for the plurality of pickets on the respective pairs of radial arms 141 and 142.

There is no uniform average shear in the intervals 144 and 146 between the pickets 143 (due to the reduced picket length) or the pickets 145 (due to the evenly spaced intervals 146). However, the overall average shear from a sum of the average shears from the intervals of the pickets 143 of the longer radial arms 141 and the pickets 145 of the shorter radial arms 142 is substantially uniform or the same, because the variances in the average shear in the intervals 146 between the pickets 145 are counterbalanced by the variances in the average shear in the intervals 144 between the pickets 143.

In this embodiment, it is also contemplated that either the longer radial arms 141 or the shorter radial arms 142 could be configured to be removed or added into the disturbance zone 16.

Figure 15A:
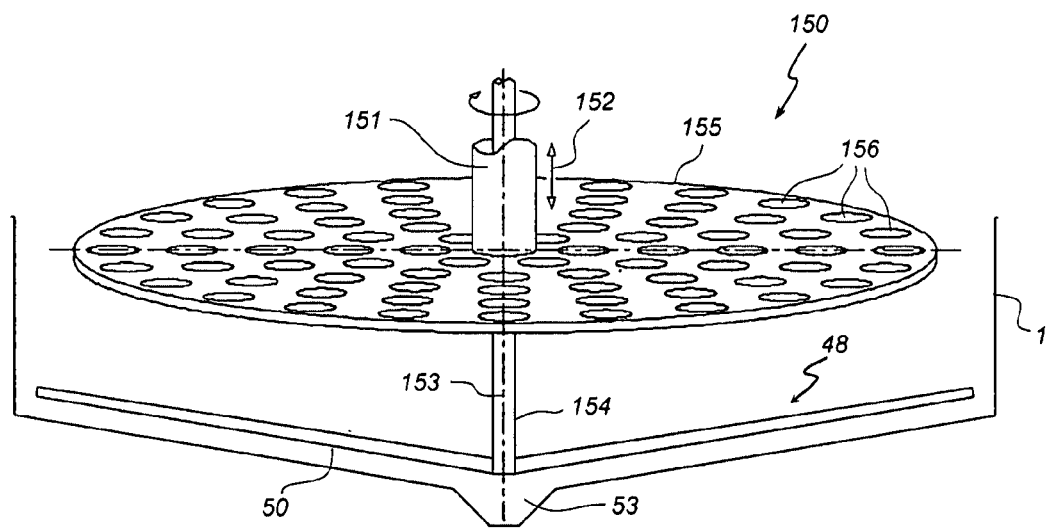
FIGS. 15A and 15B are cross-sectional and plan views of a separation device according to a further embodiment of the invention.
Figure 15B:
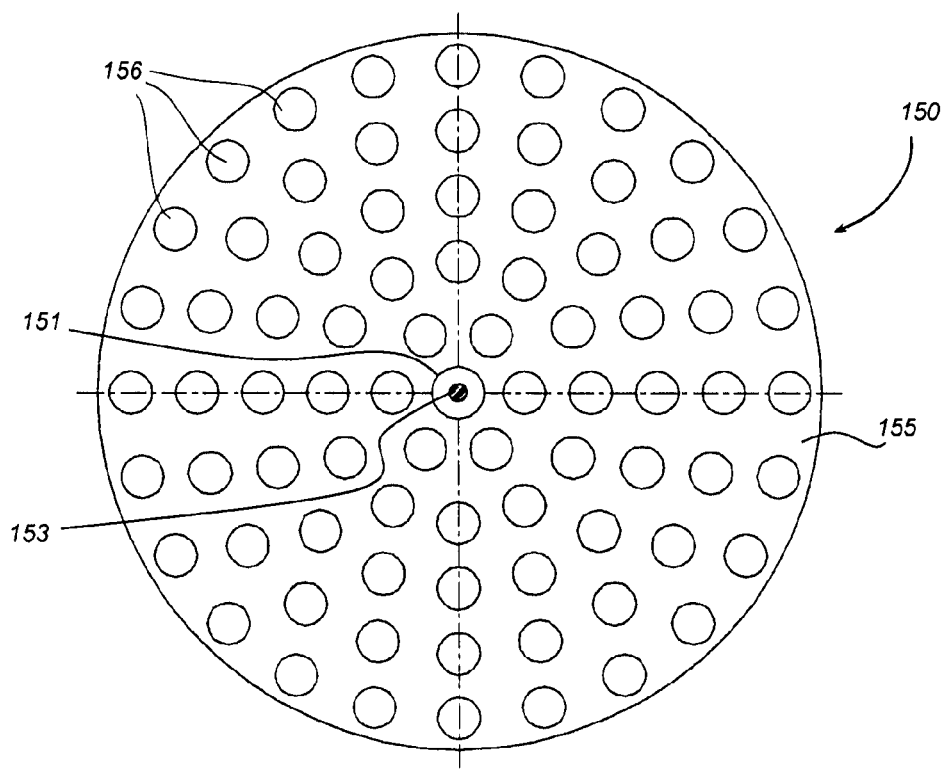

Referring to FIGS. 15A and 15B, the shearing device 150 is separately mounted to a concentric drive shaft 151 for substantially vertical motion 152 parallel to a central axis 153 of the tank and a central drive shaft 154. The shearing device 150 comprises a substantially circular plate 155 arranged substantially horizontally with respect to the tank 1 and having a series of holes or apertures 156 that are equally spaced from each other. The concentric drive shaft 151 reciprocates the plate 155 substantially vertically with respect to the pulp bed 2 and the tank 1, as indicated by arrow 152. The length of the stroke of the shearing device 150 controls the depth of the disturbance zone 16, and thus provides a way of predetermining and/or adjusting the disturbance zone 16 depth to suit operational requirements. The inventors also believe that this reciprocating vertical motion 152 results in a substantially uniform shear, and thus a substantially uniform cumulative shear, being applied to pulp passing through the disturbance zone 16 in a similar manner to that described in relation to the shearing devices, although using a vertical component of movement for the shearing device 150 rather than rotation around an axis of rotation 4G coincident with the central drive shaft 154. As the holes 156 are substantially equal in size the applied shear is substantially uniform, thus resulting in a substantially uniform cumulative shear and a substantially uniform number of shear events. Preferably, the amount of vertical movement is about 500 mm upwardly and downwardly, or in total around 1 m.

Figure 16:
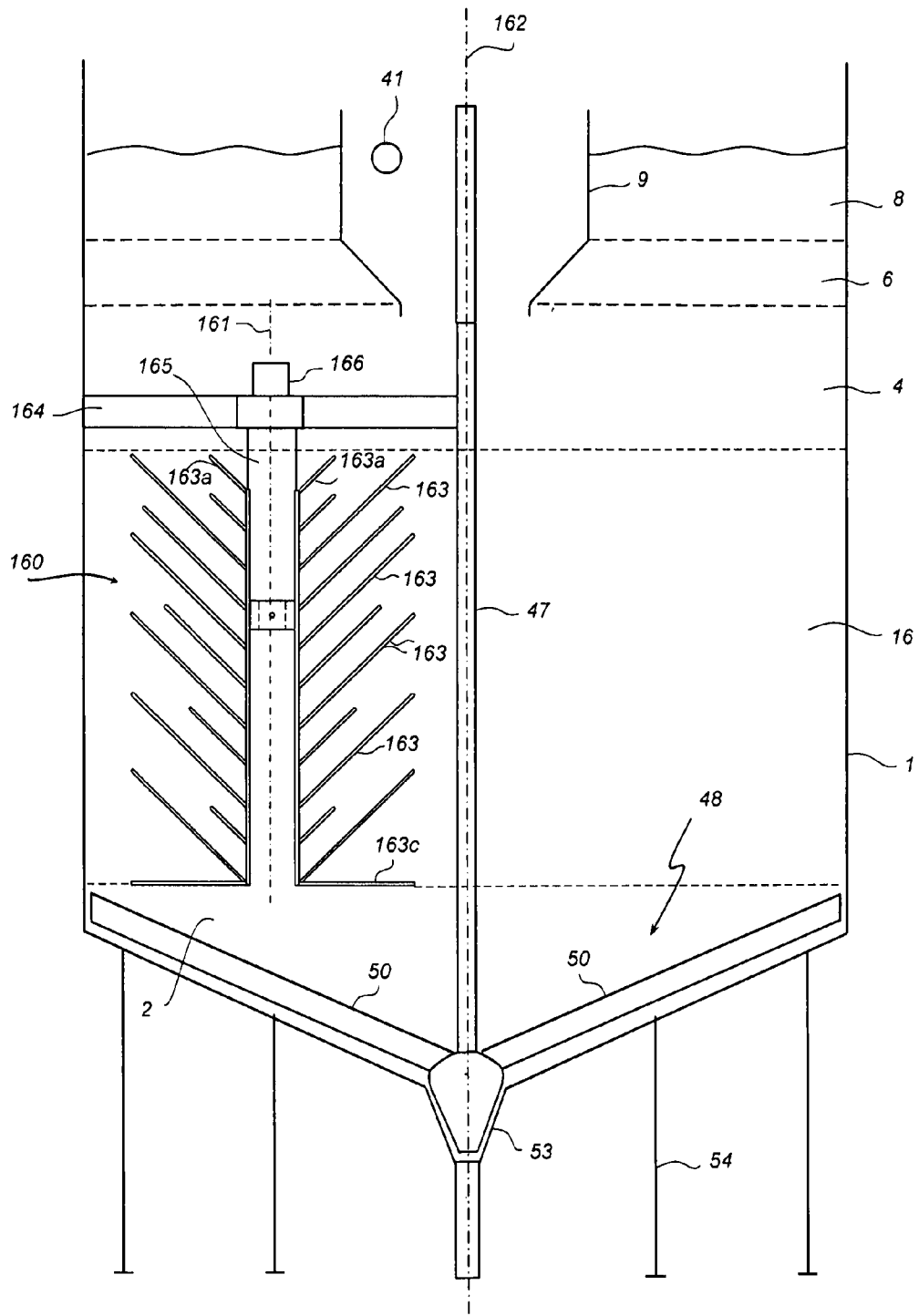
FIG. 16 is a cross-sectional view of separation device according to a further embodiment of the invention.

Referring now to FIG. 16, the shearing device 160 is mounted for rotation about an axis 161 that is eccentric or offset with respect to a central axis 162 of the tank 1. The shearing device 160 is structurally similar to the shearing device 42 of FIG. 4, having a tree-like array of angled pickets 163 and thus operates in the substantially same manner as the shearing device 42. The shearing device 160 is connected to a central drive shaft 47 axially aligned with the central axis 162 of the tank 1 by way of a support 164 and associated drive shaft 165. The central drive shaft 47 rotationally drives the support 164 to rotate the axis of rotation 161 about the central axis 162. Thus, there are two components of rotational movement, the rotation of the shearing device 160 about its axis of rotation 161 and the rotation of the axis of rotation 161 itself about the central axis 162, akin to planetary motion. That is, the motion of a spinning planet revolving in orbit around a central axis defined by the sun.

The central drive shaft 47 drives rotation of the support 164 via an epicyclic gear assembly (not shown). Alternatively, the one or more peripheral drives (not shown) may rotationally drive the support 164 via an epicyclic gear assembly. This enables multiple drives to be used that can supply an increased amount of torque to the shearing device 160, with the rotational speed of the drive shaft 165 being a function of the drive speed of the input drives and the ratios of the drive gears in the epicyclic gear assembly.

In this embodiment, an independent drive mechanism 166 drives rotation of the shearing device 160 about the axis of rotation 161, while the central drive shaft 47 drives rotation of the rake assembly 48. Consequently, the shearing device 160 can be rotated at a different speed to the rake assembly 48, or even counter-rotated in the opposite direction, to inhibit, prevent or minimise the formation of donuts in the pulp bed 2.

By splitting the rotation of the shearing device 160 from the rotation of the rake assembly 48, this embodiment also advantageously permits the provision of low torque drives for both the shearing device 160 (due to the small mechanism diameter) and the central drive shaft 47 (due to the reduced area of the central drive mechanism, as it does not have to drive the shearing device 160). However, the embodiment can be equally applied to larger tanks requiring larger torques.

In operation, the central drive shaft 47 rotates the support 164 around the thickening tank 1 about the central axis 162 clockwise or counter-clockwise, thus rotating the eccentric axis 161 about the central axis 49. Simultaneously, the drive mechanism 166 drives the shearing device 160 separately so as to rotate the pickets 163 around the eccentric axis 161 clockwise or counter-clockwise to shear the pulp aggregates or particles, so as to apply a substantially uniform cumulative shear to the pulp passing through disturbance zone 16 of the pulp bed 2.

A particular advantage of this embodiment is that the dual rotation of the shearing device 160 provides a more complex fluid motion than previous embodiments, thus increasing the difficulty for any significant volume of pulp solids in the thickened pulp bed 2 to form a stable agglomerated mass that would rotate with the shearing device 160 and/or rake assembly 48 and thus cause donutting.

It will also be appreciated by those skilled in the art that the drives and support mechanisms can be located anywhere in or on the separation device, as desired. For example, the support can be disposed adjacent the top or bottom of the tank, or anywhere in between. Similarly, the peripheral drive or drives can be located adjacent the top or bottom of the tank, within the tank perimeter, at its outer perimeter adjacent the tank sidewall or any combinations of these locations.

In other embodiments, the shearing devices illustrated in FIGS. 4, and 7 to 14 are mounted for rotation independently of the central drive shaft 47. This decoupling of the rotation of the shearing device 42, 80, 85, 88, 90, 95, 100, 110, 120, 130 and 140 and the rake assembly 48 enables the use of different rotational speeds for the shearing device and the rake assembly, respectively. This results in donut minimisation or prevention within the tank 1, as discussed above. Moreover, the shearing device 42, 80, 85, 88, 90, 95, 100, 110, 120, 130 and 140 can be rotated in the opposite direction to the rake assembly 48, further enhancing donut minimisation or prevention. In these embodiments, the shearing device is mounted to a concentric drive shaft, similar to the one illustrated in FIGS. 15A and 15B, although the concentric drive shaft in this case would be mounted for rotation about the central axis 49 of the tank 1, rather than providing substantially vertically reciprocating motion.

Figure 17:
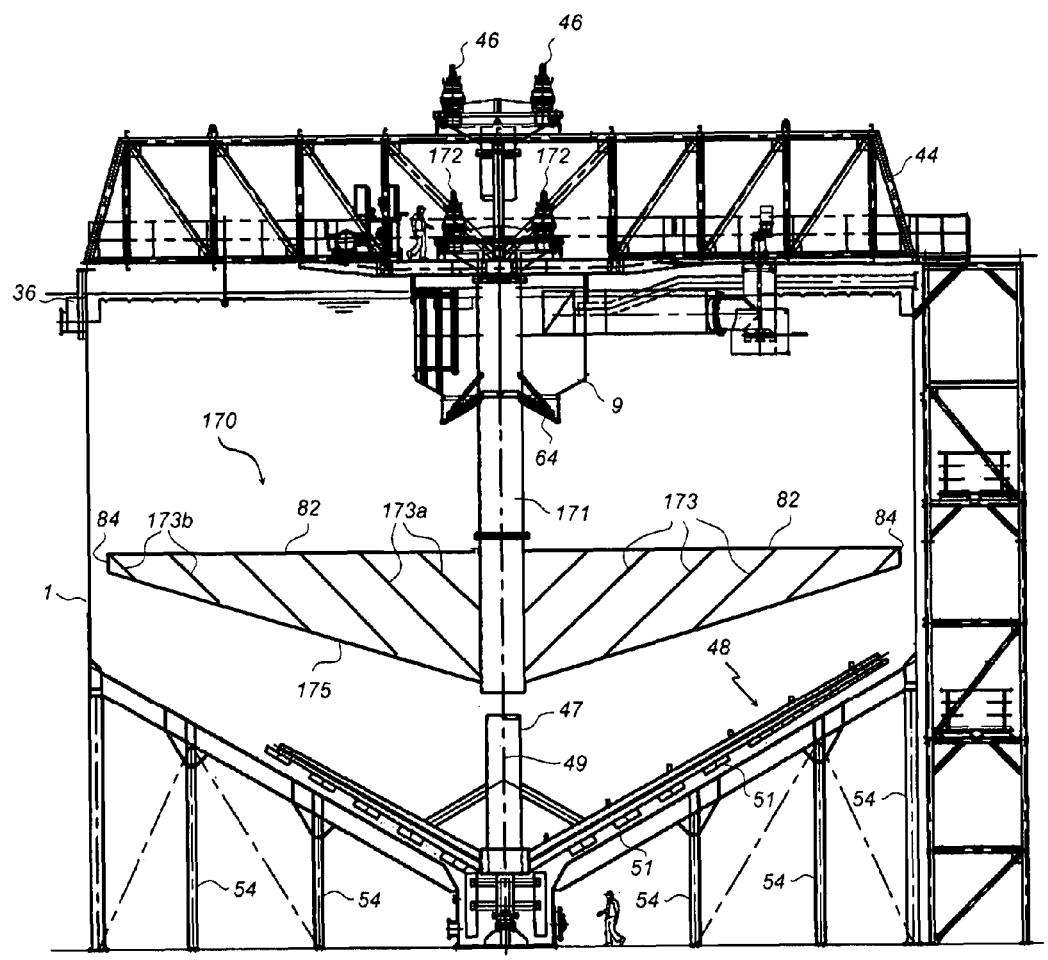
FIG. 17 is a cross-sectional view of a separation device in accordance with a further embodiment of the invention.

One such embodiment is illustrated in FIG. 17, where corresponding features have been given the same reference numerals. In this embodiment, the shearing device 170 is mounted to an outer concentric drive shaft 171 and is driven by its own pair of pinion drives 172 separate to a pair of pinion drives 46 that rotate the rake assembly 48 via inner drive shaft 47. In addition, the shearing device 170 has two radial arms 82 with pickets 173 extending from the concentric drive shaft 171 to the outer edges 84 and equispaced with respect to each other. The pickets 173 are supported by a border 175, which defines the shape of the radial arms 82. The pickets 173 are angled at approximately 45° to the vertical and connected to the border 175. In this embodiment, the shearing device 170 provides a substantially uniform cumulative shear to pulp exiting the disturbance zone 16 due to the lengths of the pickets 173 progressively reducing from the axis of rotation 49 to the outer edges 84 and the angled arrangement of the pickets. However, the shearing device 170 does not provide uniform average shear in the intervals between the pickets 173, since they are equispaced with respect to each other. That is, the increased shear force applied by the outer pickets 173b is compensated by an adjustment to the length of the pickets 173. While this results in the average shear varying between the pickets 173, the cumulative shear from this picket configuration is substantially uniform, since the reduced picket length counterbalances the increased shear at the outer edges 84. Accordingly, the shearing device 170 provides an optimal shear to the pulp in accordance with the invention.

Additional shearing device configurations for the separation device 160 are illustrated and briefly described in relation to FIGS. 18A to 22B, where corresponding features have been given the same reference numerals. As these shearing devices substantially operate in the same manner as the operation of the shearing device 161, a detailed description of their operation will not be repeated.

Figure 18A:
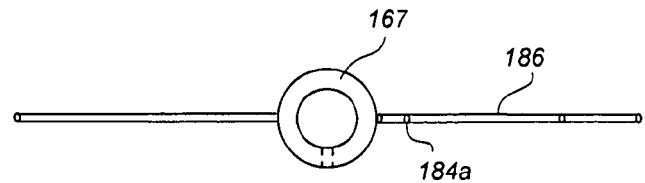
FIG. 18A is a plan view of a shearing device for use in the separation device of FIG. 16.
Figure 18B:
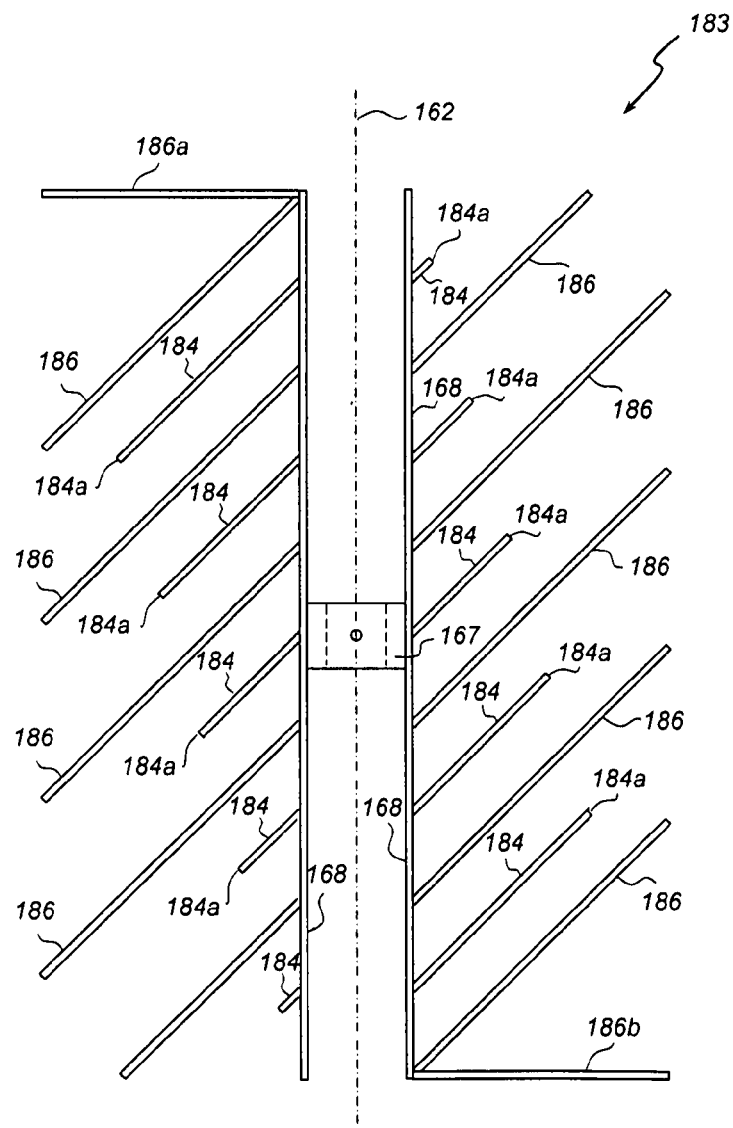
FIG. 18B is a front view of the shearing device illustrated in FIG. 18A.

Referring to FIGS. 18A and 18B, the shearing device 183 is arranged so that progressively shorter angled pickets 184 on either side of the stems 168 have their respective tips 184a pointing outwardly and alternate between relatively longer angled pickets 186. Again, the shorter pickets 184 provide an increased number of varied shear events closer towards the rotational axis 162. Both sets of "primary" pickets 186 and "secondary" pickets 184 are asymmetrical with respect to the axis of rotation 162. Two of the pickets 186a and 186b extend substantially horizontally at the top and bottom portions of the shearing device 183, respectively. The primary pickets 186 also define a substantially rectangular cross-section approximating the radial cross-section of the tank.

Figure 19A:
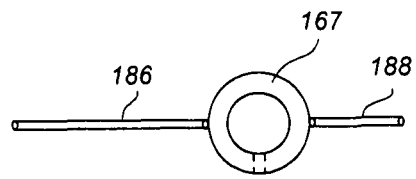
FIG. 19A is a plan view of a shearing device for use in the separation device of FIG. 16.
Figure 19B:
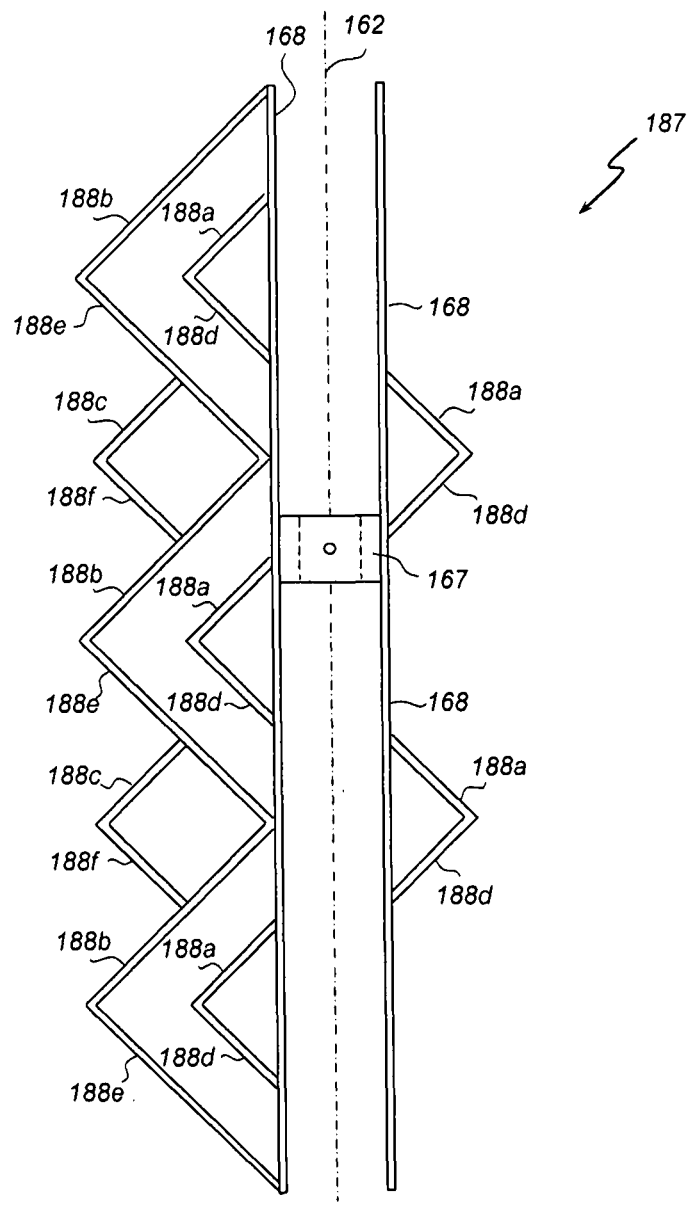
FIG. 19B is a front view of the shearing device illustrated in FIG. 19A.

Referring to FIGS. 19A and 19B, the shearing device 187 comprises a plurality of angled pickets 188 arranged in a zigzag-like fashion to define a tiered saw-tooth like profile. Pickets 188a, 188b and 188c extend downwardly relative to the stems 168, whereas the pickets 188d, 188e and 188f extend upwardly relative to the stems. The downwardly extending pickets 188a, 188b and 188c are connected to the upwardly extending pickets 188d, 188e and 188f, respectively, to define an asymmetric picket configuration. One side of the shearing device 187 has two "tiers" of teeth, comprising an inner tier of pickets 188a and 188d and an outer tier of pickets 188b and 188e, with the pickets 188c and 188f supplementing the outer tier. The other side of the shearing device has a single inner tier of pickets 188a and 188d. This picket configuration provides an increased number of varied shear events closer towards the rotational axis 162.

Figure 20A:
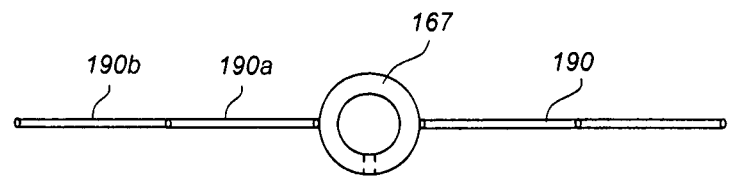
FIG. 20A is a plan view of a shearing device for use in the separation device of FIG. 16.
Figure 20B:
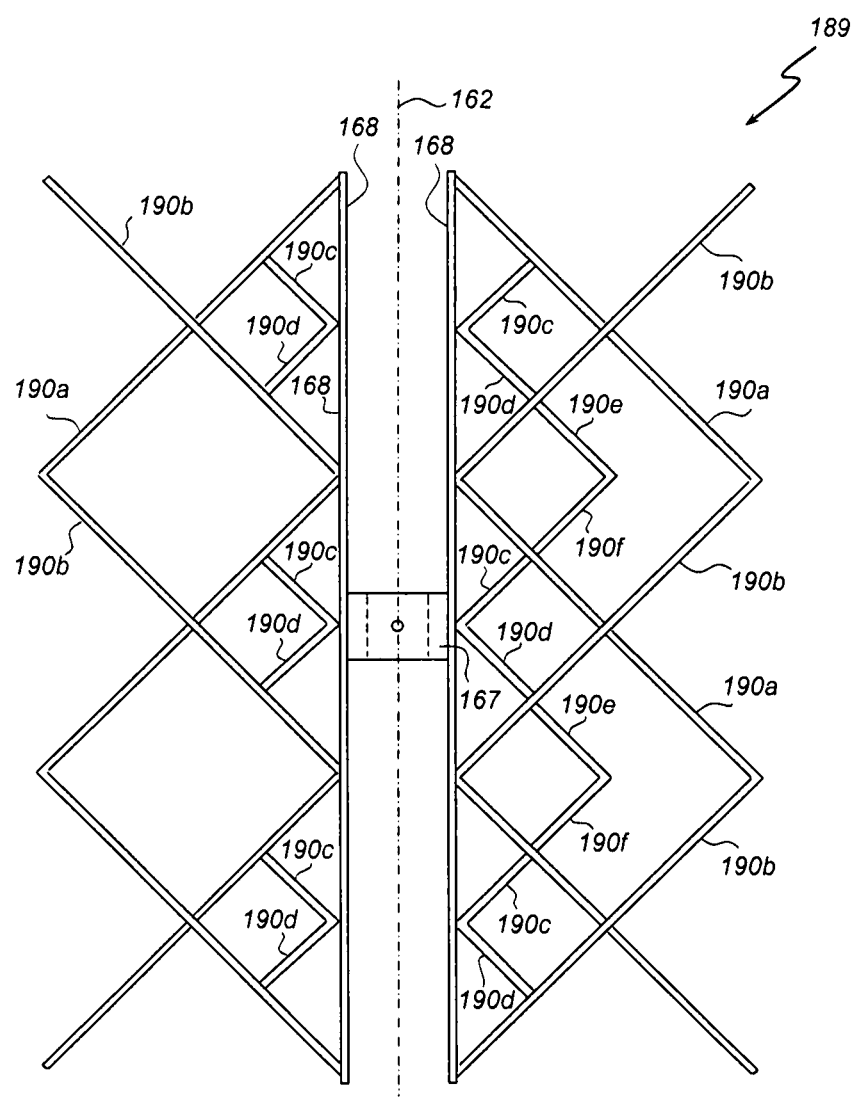
FIG. 20B is a front view of the shearing device illustrated in FIG. 20A.

Referring to FIGS. 20A and 20B, the shearing device 189 has a plurality of pickets 190 that form an asymmetric mesh-like structure, similar to the mesh 49 illustrated in the embodiment of the invention of FIG. 13. Pickets 190a, 190d and 190e extend downwardly with respect to the stems 168, whereas the pickets 190b, 190c and 190f extend upwardly with respect to the stems. The pickets 190 are arranged so that a downwardly extending picket 190a crosses an upwardly extending picket 190b to define an "X"-shape, with each "X" being joined together to define a general diamond-like mesh appearance. Secondary upwardly extending pickets 190c and downwardly extending pickets 190d are disposed adjacent the stems 168, with the upwardly extending pickets 190c connected to the upwardly extending pickets 190d. An additional set of pickets 190e and 190f are disposed between two X-shapes to provide an asymmetric configuration. The pickets 190 are angled at approximately 45° to the vertical plane. Again, this picket configuration provides an increased number of varied shear events closer towards the rotational axis 162.

Figure 21A:
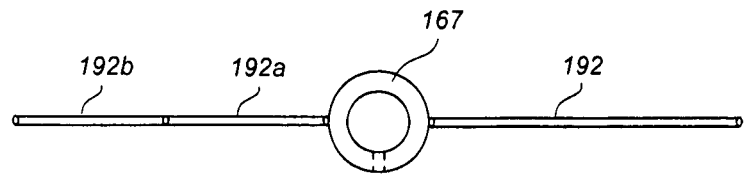
FIG. 21A is a plan view of a shearing device for use in the separation device of FIG. 16.
Figure 21B:
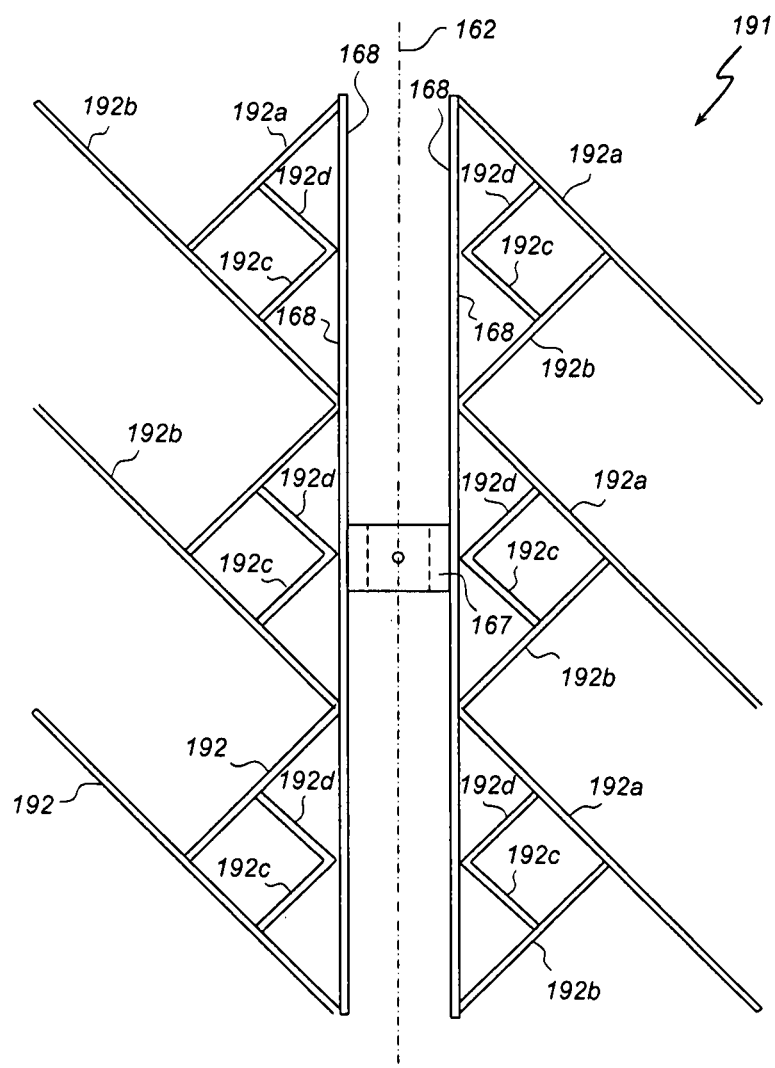
FIG. 21B is a front view of the shearing device illustrated in FIG. 21A.

Referring to FIGS. 21A and 21B, the shearing device 191 has a plurality of pickets 192 that are arranged asymmetrically about the axis of rotation 162. The pickets 192a extend downwardly while pickets 192b extend upwardly relative to their respective stems 168, the downwardly extending pickets 192a being connected to upwardly extending pickets 192b. Each of the pickets 192 is angled with respect to the vertical plane at approximately 45°. There is an inner set of secondary pickets adjacent the stems 168, with downwardly extending pickets 192c connected to upwardly extending pickets 192d. This picket configuration provides an increased number of varied shear events closer towards the rotational axis 162.

Figure 22A:
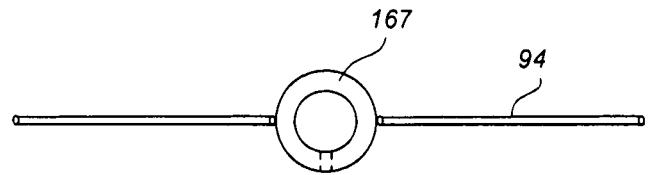
FIG. 22A is a plan view of a shearing device for use in the separation device of FIG. 16.
Figure 22B:
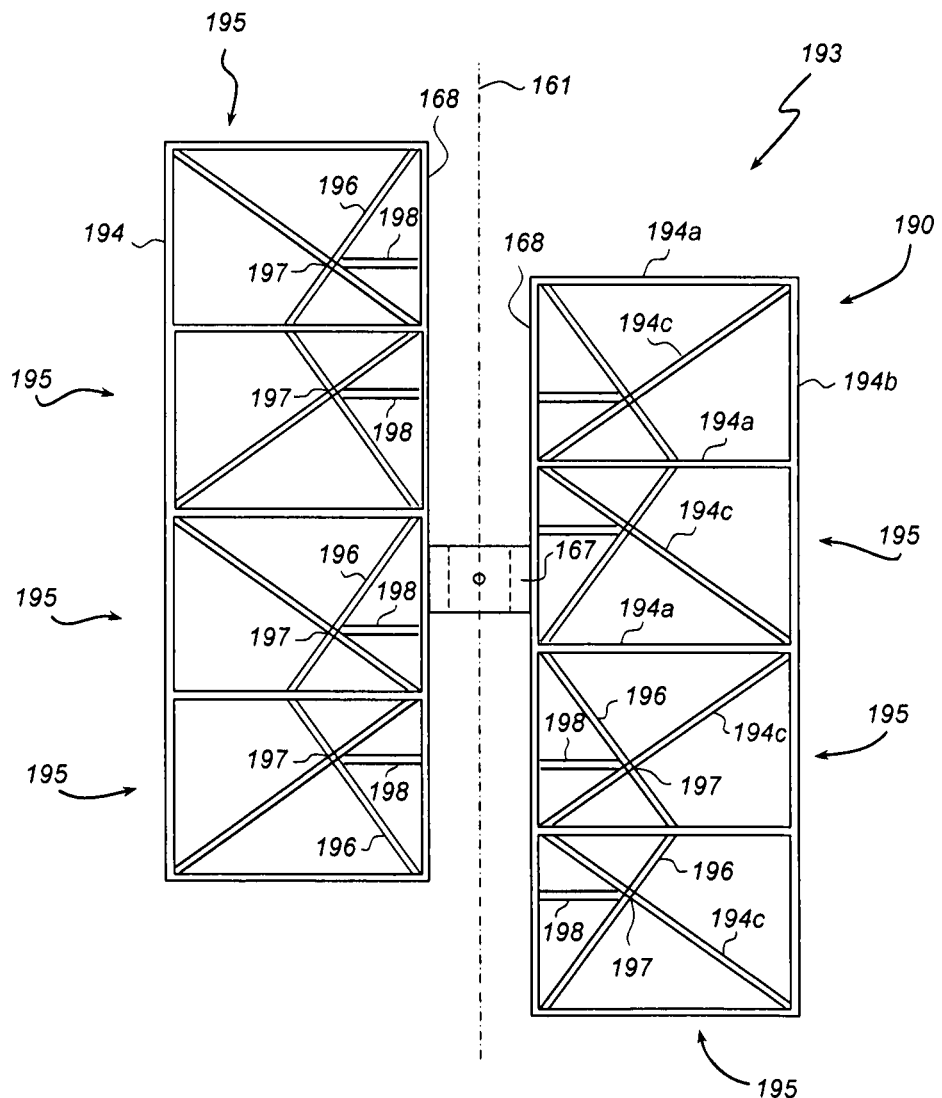
FIG. 22B is a front view of the shearing device illustrated in FIG. 22A.

Referring to FIGS. 22A and 22B, the shearing device 193 has a plurality of pickets 194 arranged to define vertically offset box-like structures 195, with horizontal pickets 194a and vertical pickets 194b defining the horizontal and vertical sides of the boxes 195, respectively. In addition, diagonally extending pickets 194c connect one pair of corners of each box 195 in a zigzag-like fashion to define a saw-tooth-like path, the pickets 194c being angled at approximately 45° to the vertical plane. Angled pickets 196 intersect the pickets 194c so that the point of intersection 197 is offset to the centre of each box 195 and are disposed in a similar zigzag-like fashion to define a saw-tooth-like path. Furthermore, horizontal pickets 198 are provided that connect the respective points of intersection 197 to the stems 168. This picket configuration provides an increased number of varied shear events closer towards the rotational axis 162.

Figure 23:
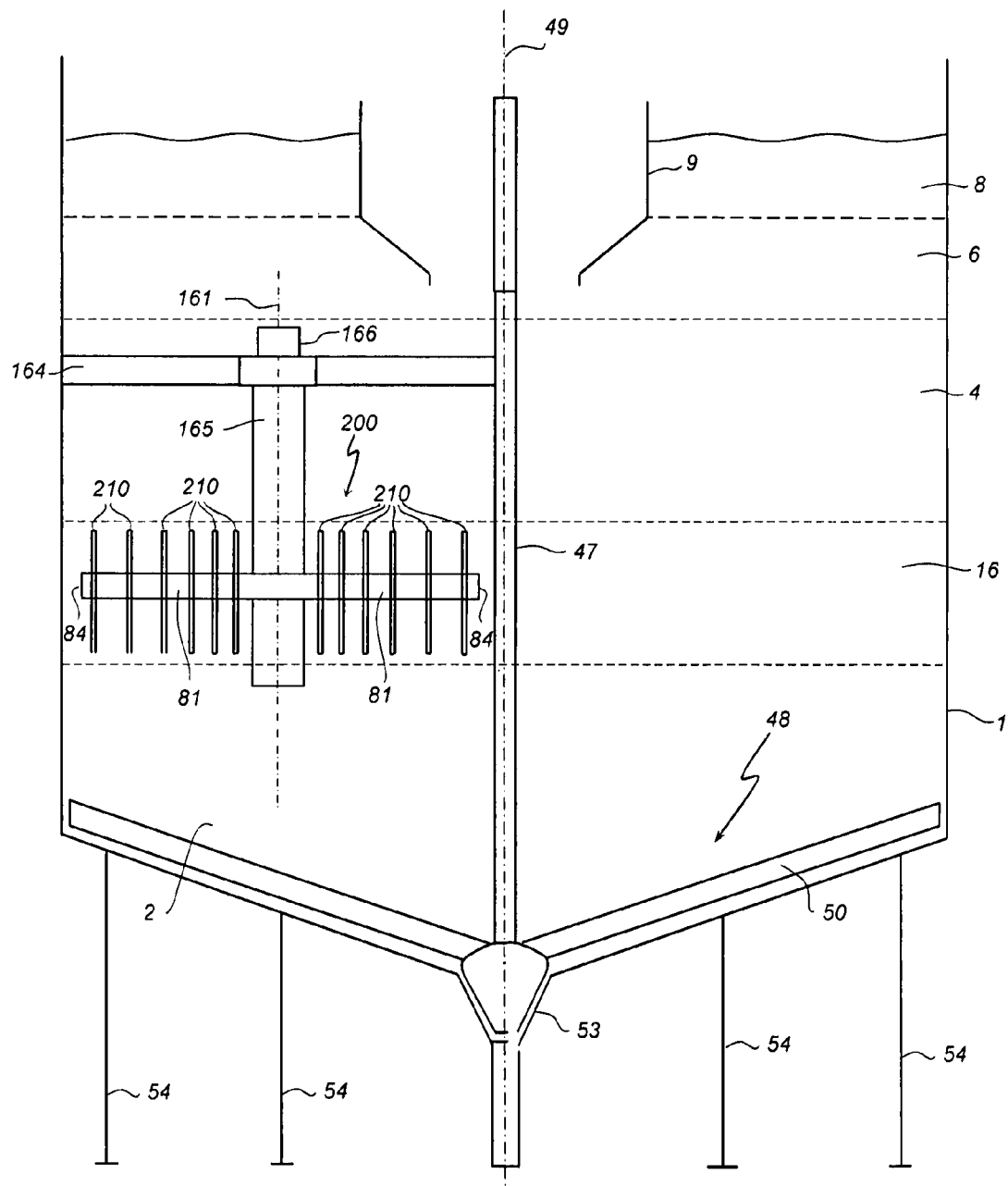
FIG. 23 is a cross-sectional view of a separation device according to a further embodiment of the invention.

In other embodiments, the shearing devices illustrated in FIGS. 4, 7 to 14 and 17 are mounted for rotation about a parallel, eccentric or offset axis to the central axis 49 of the tank 1 in the manner illustrated in FIG. 16. One such embodiment is illustrated in FIG. 23, where corresponding features have been given the corresponding reference numerals. In this embodiment, the shearing device 200 is mounted for rotation about an axis 161 that is eccentric or offset with respect to a central axis 49 of the tank 1 in the same manner as the shearing device 160 of FIG. 16. Accordingly, a detailed description of the mounting arrangement for the shearing device 200 will not be repeated. The primary difference between this embodiment and the embodiment of FIG. 16 is that the shearing device 200 has two radial arms 81 with a plurality of shearing elements 210 spaced at intervals 83 that progressively increase in proportion to the distance of their associated shearing elements from the axis of rotation 161 to respective outer edges 84 of the radial arms 81. In addition, the shearing elements are in the form of vertically extending linear rods or pickets 210 mounted to each radial arm 81. Due to the dual rotation of the shearing device 200 about the eccentric axis 161 and the eccentric axis about the central axis 49, the inventors believe that this results in shear being applied substantially uniformly across the disturbance zone 16.

Figure 24:
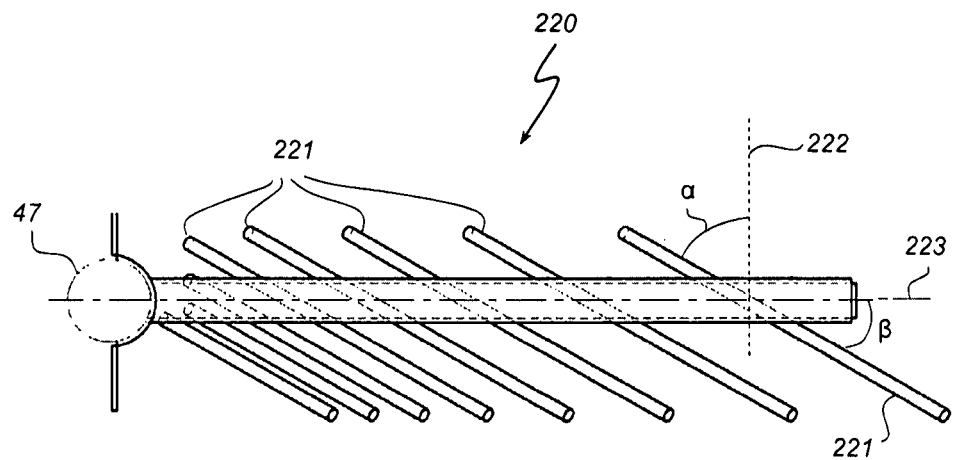
FIG. 24 is a partial plan view of a shearing device according to a seventeenth embodiment of the invention.
Figure 25:
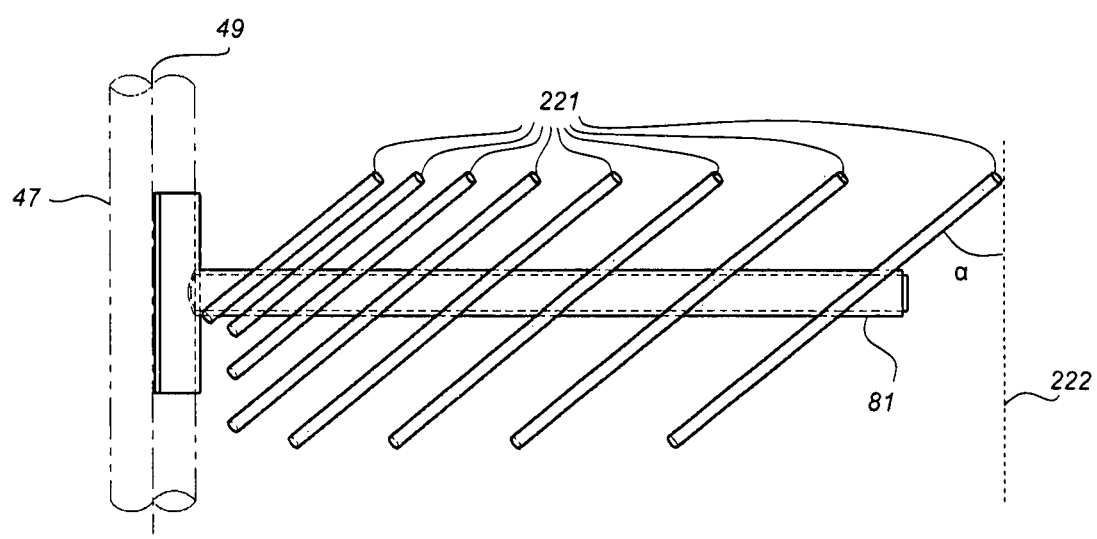
FIG. 25 is a partial front view of the shearing device of FIG. 24.
Figure 26:
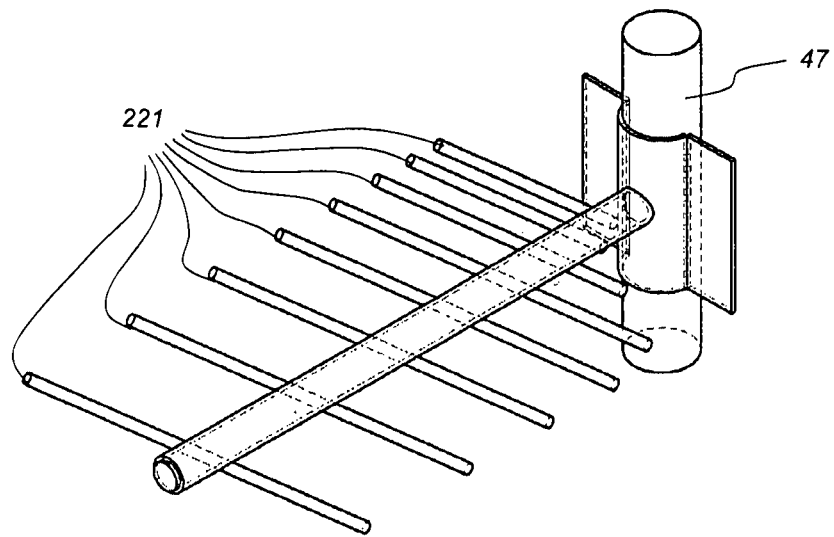
FIG. 26 is a partial perspective view of the shearing device of FIG. 24.
Figure 27:
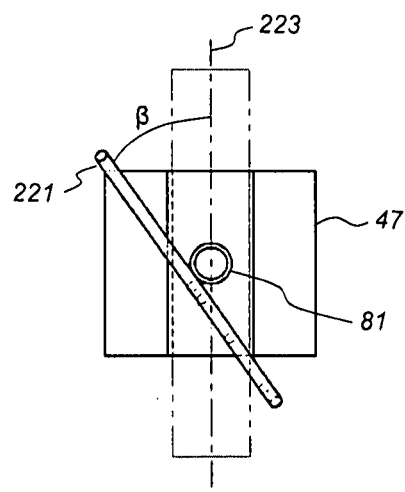
FIG. 27 is a partial end view of the shearing device of FIG. 24.

Likewise, the configurations of the shearing devices illustrated in FIGS. 16 to 22B may also be suitably modified for rotation about the central axis 49 using a concentric drive shaft in the manner illustrated in FIGS. 4, 7 to 14 and 17. Furthermore, the shearing devices of FIGS. 2, 7 to 14 and 16 to 22B may also be suitably adapted for substantially vertically reciprocating motion parallel to, rather than rotation about, the central axis 49. While the embodiments have been described with reference to the rake assembly 48 being rotated about a central axis of the tank, it will be appreciated that the rotational axis of the rake assembly may also be parallel, offset or eccentric to the central axis of the tank. In addition, the preferred embodiments in FIGS. 4, 7, 8A, 9 to 11 and 16 to 22B have been described and illustrated with pickets angled with respect to a vertical plane that is at right angles to the radial arm. However, it will be appreciated that the pickets can be angled with respect to other vertical planes, such as a vertical plane parallel to or coplanar with the radial arms, as illustrated in FIG. 14. Referring to FIGS. 24 to 27, a further embodiment of the invention is illustrated, where corresponding features have been given the same reference numerals. In the shearing device 220 of this embodiment, the pickets 221 are arranged in the configuration shown in the first embodiment of the invention shown in FIG. 7, being inclined at an angle α with respect to a vertical plane 222 that is at right angles to the radial arm 81, as in the embodiments mentioned above and best shown in FIGS. 24 and 25. However, the pickets 221 are also inclined at an angle β with respect to a vertical plane 223 parallel to or coplanar with the radial arms 81 so that the pickets 221 have an angle of incidence with respect to the direction of rotation of the shearing device 220, as best shown in FIGS. 24 and 27. This orientation of the pickets 221 enables relatively longer pickets to be used in the shearing device 220 compared to the length of the pickets in other configurations, and thus enhances the effect of the substantially uniform cumulative shear to the pulp exiting the region. It will be appreciated that in other embodiments, the pickets may be only angled with respect to the vertical plane 223.

Moreover, whilst the preferred embodiments of the invention have been described as employing shearing elements in the form of linear pickets or rods, it would be appreciated by one skilled in the art that other configurations for the shearing elements can be used, such as V-shaped angled rods, half or semi-circular tubes or other shearing elements having different polygonal cross-sections. In particular, the pickets themselves can be altered in shape to produce the desired shear profile. For example, a non-linear picket can be used, such as a spiral or helical shape.

While the preferred embodiments have been described and illustrated in a manner to produce an optimal disturbance, preferably shear, substantially uniformly across the disturbance zone 16, where the disturbance zone includes substantially the entire upper region 17, one skilled in the art will appreciate that similar advantageous effects could be obtained by causing the optimal disturbance or applying the optimal shear across a disturbance zone that is a proportion of the upper region. This proportion of the upper region 17 may include a partial cross-sectional area or even a partial volume of the tank. For example, individual pickets can be removed from the radial arms so that the optimal shear occurs at a series of intervals, or mostly only towards the outer perimeter of the tank 1 or towards the inner radial area of the tank adjacent or close to the axis of rotation. In this case, the disturbance zone 16 is effectively segmented across the cross-section of the tank 1. Alternatively, it could be viewed as providing multiple disturbance zones separated by quiescent areas in the upper region. On either interpretation, the optimal disturbance caused or shear applied substantially uniformly across a disturbance zone can occupy at least 10% of the volume of the upper region 17 up to the entire upper region (100%). As the amount of pulp approximates to the cross-sectional area of the upper region 17, then the disturbance or shear is applied to at least 10% to 100% of the networked pulp in the upper region 17 within a predetermined period of time corresponding to the passage of the networked pulp through the disturbance zone 16. The inventors recognise that there may be situations where it is desired that not all of the networked pulp is subjected to a disturbance or shear, and in such cases it is preferred that at least 30% of the pulp passing through the upper region (ie. the disturbance zone being 30% of the upper region), more preferably at least 50% of the pulp passing through the upper region (ie. the disturbance zone being 50% of the upper region) or even more preferably at least 70% of the pulp passing through the upper region (ie. the disturbance zone being 70% of the upper region) are disrupted in the disturbance zone 16. However, the inventors believe that to maximise the efficiency of the shearing device and thus improve thickener performance, it is particularly preferred that at least 75% of the pulp passing through the upper region (the disturbance zone being 75% of the upper region) is subjected to the optimal disturbance or shear, more preferably 80%, even more preferably 90% and even yet more preferably 95% to 100% of the pulp passing through the upper region (the disturbance zone being 95% to 100% of the upper region) in order to obtain significant advantages in the use of the invention. This applies irrespective whether substantially uniform cumulative shear, substantially uniform average shear or a substantially uniform number of shear events, or any combination thereof, is applied in the disturbance zone. It also extends to the disturbance being caused by another mechanism other than the application of shear substantially uniformly across the disturbance zone.

In addition, while most of the preferred embodiments have been illustrated with two radial shearing arms for clarity, in other embodiments, the shearing devices have the illustrated picket configurations but with multiple shearing arms, for example, four, six and eight or more shearing arms, spaced apart (equidistantly or not) to apply shear substantially uniformly across the disturbance zone. In these embodiments, each shearing arm may apply shear to different portions of the disturbance zone. For example, a shearing device may have eight arms with shearing elements that are offset to each other so that while each arm only shears a portion of the upper region, the total effect of the shearing device is to apply shear in a disturbance zone that is substantially equal to the entire upper region.

Furthermore, it will be appreciated that the shearing device can be optionally controlled so that the average cumulative shear varies from a predetermined optimal shear value, either above or below. The inventors contemplate that the predetermined optimal shear value and any variation will depend on one or more parameters selected from the group consisting essentially of the speed of the shearing device, the shape of the shearing device, the depth of the shearing region, the pulp composition, the pulp particle size, the pulp flow velocity in the tank, the pulp yield stress, the pulp viscosity, the underflow specific gravity, the underflow weight per weight percentage, the rate at which flocculant is added to the suspension and the flux of the suspension from the pulp settles. Thus, the average cumulative shear could vary and be substantially within 20% above or below the predetermined optimal shear value, 30% above or below the predetermined optimal shear value, 40% above or below the predetermined optimal shear value, or even 50% above or below the predetermined optimal shear value.

The invention also permits a separation device to operate at a higher flux or throughput of feed material without a reduction in the underflow pulp density. In this case, the disturbance substantially uniformly across the disturbance zone still reduces the relative density of the pulp below the disturbance zone compared to the density of the pulp above the disturbance zone, but due to the high throughput of feed material there is less time for the pulp to settle. As a result, the overall underflow density of the pulp remains similar to or the same as the underflow pulp density of a separation device operated without implementing the invention. The advantage of the invention in this situation is enabling the separation device to operate at a higher throughput, yet produce the approximately similar or same underflow pulp density. If a convention separation device were to be operated at a higher throughput, the overall pulp density would reduce accordingly, since there is less time for the pulp to settle from the feed material.

It will be appreciated by one skilled in the art that in the invention, causing a disturbance substantially uniformly across the distribution zone disrupts the networked pulp in the disturbance zone, thereby entrained liquid from the networked pulp and increasing the relative density of the pulp below the disturbance zone. That is, the disturbance substantially uniformly across the distribution zone breaks up, disturbs, re-arranges, re-orients or "shakes" the organised structure of the networked pulp, including but not limited to the continuous contact between the networked pulp. This causes the release of trapped liquid that can escape upwardly to the clarified zone of liquor. As the pulp below the disturbance zone has a higher relative density, it has an increased packing density, enabling quicker settling and thus more pulp to be compacted in the pulp bed below the disturbance zone. As a consequence, the underflow density of the pulp bed is maximised and the maximum amount of dilute liquor can be recovered through the overflow launder. This effect is particularly advantageous where the disturbance, preferably in the form of shear, is in a disturbance zone in the upper region of the pulp bed. As a consequence, the invention achieves significant efficiencies in performance and the amount of settled material that is obtained. Another advantage is that the turbulence created in the disturbance zone inhibits or prevents the formation of donuts in the pulp bed or networked pulp layer. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. A method of separating pulp from a feed material within a tank, the method comprising the steps of:
   introducing the feed material into the tank;
   allowing the feed material to settle in the tank,
   allowing the pulp to form into aggregates;
   allowing the pulp aggregates to settle towards the bottom of the tank and form a networked layer of pulp; and
   applying shear substantially uniformly across a disturbance zone in an upper region of the networked layer by rotating within the disturbance zone a shearing device having a plurality of shearing elements spaced at uneven intervals with respect to each other so as to disrupt the networked pulp in the disturbance zone;
   thereby releasing entrained liquid from the networked pulp in the disturbance zone and increasing the relative density of the pulp below the disturbance zone.

2. The method of claim 1, wherein the disturbance zone has a depth d and pulp aggregates move through the disturbance zone at a speed v and the method comprises applying the shear across substantially the entire disturbance zone within a time t, where $t = d/v$.

3. The method of claim 1, comprising applying the shear continuously.

4. The method of claim 1, comprising applying the shear intermittently.

5. The method of claim 1, comprising applying shear in a manner such that the pulp below the disturbance zone reforms with a substantially higher density relative to the pulp above the disturbance zone.

6. The method of claim 1, comprising applying shear in a manner such as to induce a stepwise increase in the density of the pulp below the disturbance zone.

7. The method of claim 1, wherein the disturbance zone is at or adjacent the top of the networked layer of pulp.

8. The method of claim 7, wherein the disturbance zone extends from the upper region of the networked layer of pulp to include a portion of the hindered zone.

9. The method of claim 1, wherein the shearing elements are spaced apart along a line and the average shear in all the intervals between the shearing elements along the line is substantially uniform.

10. The method of claim 1, wherein the step of applying shear comprises applying a substantially uniform cumulative shear to the networked pulp in the disturbance zone.

11. The method of claim 1, wherein the step of applying shear comprises applying a substantially uniform number of shear events to the networked pulp in the disturbance zone.

12. The method of claim 1, wherein the method comprises the step of driving movement of the shearing device independently of a central drive shaft.

13. A separation device for separating pulp from a feed material, the separation device comprising:
- a tank for receiving the feed material, wherein feed material settles in the tank and the pulp forms into aggregates, the pulp aggregates settling towards the bottom of the tank and forming a networked layer of pulp; and
- a shearing device for applying shear substantially uniformly across a disturbance zone in an upper region of the networked layer by rotating the shearing device within the disturbance zone, so as to disrupt the networked pulp in the disturbance zone;
- thereby releasing entrained liquid from the networked pulp in the disturbance zone and increasing the relative density of the pulp below the disturbance zone, wherein the shearing device comprises a plurality of shearing elements spaced at uneven intervals with respect to each other.

14. The separation device of claim 13, wherein the shearing device comprises a plurality of shearing elements, the shearing elements being spaced apart along at least one arm of the shearing device to define respective intervals therebetween.

15. The separation device of claim 14, wherein the uneven intervals progressively increase from an axis of rotation of the shearing device to an outer edge of at least one arm.

16. The separation device of claim 14, wherein the shearing elements progressively decrease in length from an axis of rotation of the shearing device to an outer edge of at least one arm.

17. The separation device of claim 14, wherein one or more shearing elements progressively decrease in thickness from an axis of rotation of the shearing device to an outer edge of at least one arm.

18. The separation device of claim 13, wherein the shearing device rotates within the disturbance zone about an axis of rotation that is parallel to a central axis of the tank.

19. The separation device of claim 13, wherein the shearing elements define a tapered profile of the shearing device.

20. The separation device of claim 13, wherein the separation device comprises a drive mechanism for the shearing device that is independent of a central drive shaft of the tank.

21. The separation device of claim 20, wherein the independent drive mechanism comprises a drive shaft concentric to a central drive shaft of the tank.

22. The separation device of claim 13, wherein the shearing device comprises at least first and second shearing arms supported for movement within the disturbance zone, a first plurality of shearing elements attached to the first shearing arm, and a second plurality of shearing elements attached to the second shearing arm, and wherein the shearing elements of each of said first and second pluralities of shearing elements are spaced at uneven intervals with respect to each other.

23. The separation device of claim 13, wherein the intervals between shearing elements progressively increase in proportion to the distance of the respective shearing elements from an axis of rotation of the shearing device, to induce at least one of a substantially uniform cumulative shear and a substantially uniform average shear to the networked pulp in the intervals between the shearing elements.

24. The separation device of claim 13, wherein the shearing device is rotatably mounted to a support, the support being disposed for movement about a central axis of the tank.

25. The separation device of claim 13, wherein two or more shearing elements are arranged asymmetrically about an axis of rotation of the shearing device.

26. The separation device of claim 13, wherein the separation device comprises a drive mechanism for the shearing device that is independent of a central drive shaft of the tank.

27. The separation device of claim 26, wherein the independent drive mechanism comprises a drive mechanism arranged at an outer edge of the tank.

28. The separation device of claim 26, wherein the independent drive mechanism comprises a drive shaft concentric with a central drive shaft of the tank.

29. The separation device of claim 13, wherein one or more shearing elements extend at an angle of inclination with respect to a vertical plane.

30. The separation device of claim 29, wherein the angle of inclination is between 30° and 50°.

* * * * *